US011636309B2

(12) United States Patent
Fisher et al.

(10) Patent No.: US 11,636,309 B2
(45) Date of Patent: Apr. 25, 2023

(54) SYSTEMS AND METHODS FOR MODELING PROBABILITY DISTRIBUTIONS

(71) Applicant: Unlearn.AI, Inc., San Francisco, CA (US)

(72) Inventors: Charles Kenneth Fisher, San Francisco, CA (US); Aaron Michael Smith, San Francisco, CA (US); Jonathan Ryan Walsh, El Cerrito, CA (US)

(73) Assignee: Unlearn.AI, Inc., San Francisco, CA (US)

( * ) Notice: Subject to any disclaimer, the term of this patent is extended or adjusted under 35 U.S.C. 154(b) by 636 days.

(21) Appl. No.: 16/249,854

(22) Filed: Jan. 16, 2019

(65) Prior Publication Data

US 2019/0220733 A1 Jul. 18, 2019

Related U.S. Application Data

(60) Provisional application No. 62/792,648, filed on Jan. 15, 2019, provisional application No. 62/618,440, filed on Jan. 17, 2018.

(51) Int. Cl.

| | |
|---|---|
| ***G06N 3/04*** | (2006.01) |
| ***G06N 3/08*** | (2006.01) |
| ***G06N 3/088*** | (2023.01) |

(52) U.S. Cl.

CPC ......... *G06N 3/0445* (2013.01); *G06N 3/0454* (2013.01); *G06N 3/0472* (2013.01); *G06N 3/088* (2013.01)

(58) Field of Classification Search

None

See application file for complete search history.

(56) References Cited

U.S. PATENT DOCUMENTS

| | | | |
|---|---|---|---|
| 8,150,629 | B2 | 4/2012 | Geerts et al. |
| 10,398,389 | B1 | 9/2019 | D'Alessandro et al. |

(Continued)

FOREIGN PATENT DOCUMENTS

| | | | |
|---|---|---|---|
| CA | 3088204 | A1 | 7/2019 |
| CN | 111758108 | A | 10/2020 |

(Continued)

OTHER PUBLICATIONS

Chatterjee et al. "Explaining Complex Distributions with Simple Models." 2008. Econophysics. pp. 1-14 (Year: 2008).*

(Continued)

*Primary Examiner* — Abdullah Al Kawsar
*Assistant Examiner* — Asher H. Jablon
(74) *Attorney, Agent, or Firm* — KPPB LLP

(57) ABSTRACT

Systems and methods for modeling complex probability distributions are described. One embodiment includes a method for training a restricted Boltzmann machine (RBM), wherein the method includes generating, from a first set of visible values, a set of hidden values in a hidden layer of a RBM and generating a second set of visible values in a visible layer of the RBM based on the generated set of hidden values. The method includes computing a set of likelihood gradients based on the first set of visible values and the generated set of visible values, computing a set of adversarial gradients using an adversarial model based on at least one of the set of hidden values and the set of visible values, computing a set of compound gradients based on the set of likelihood gradients and the set of adversarial gradients, and updating the RBM based on the set of compound gradients.

16 Claims, 17 Drawing Sheets

(56) References Cited

U.S. PATENT DOCUMENTS

| | | | |
|---|---|---|---|
| 10,650,929 | B1 | 5/2020 | Beck et al. |
| 10,726,954 | B2 | 7/2020 | Su et al. |
| 2004/0193019 | A1 | 9/2004 | Wei |
| 2008/0082359 | A1 | 4/2008 | Jung et al. |
| 2009/0326976 | A1 | 12/2009 | Morris |
| 2010/0235310 | A1 | 9/2010 | Gage et al. |
| 2010/0254973 | A1 | 10/2010 | Mohapatra et al. |
| 2011/0218817 | A1 | 9/2011 | Spiegel |
| 2014/0019059 | A1 | 1/2014 | Shankle et al. |
| 2014/0257128 | A1 | 9/2014 | Moxon et al. |
| 2015/0010610 | A1 | 1/2015 | Tom et al. |
| 2016/0140300 | A1 | 5/2016 | Purdie et al. |
| 2016/0180053 | A1 | 6/2016 | Fuertinger et al. |
| 2016/0222448 | A1 | 8/2016 | Horvath |
| 2017/0286627 | A1 | 10/2017 | Barhak |
| 2017/0344706 | A1 | 11/2017 | Torres et al. |
| 2017/0357844 | A1 | 12/2017 | Comaniciu et al. |
| 2017/0372193 | A1 | 12/2017 | Mailhe et al. |
| 2018/0018590 | A1 | 1/2018 | Szeto et al. |
| 2018/0046780 | A1 | 2/2018 | Graiver et al. |
| 2018/0315505 | A1 | 11/2018 | Itu et al. |
| 2019/0019570 | A1 | 1/2019 | Fuertinger et al. |
| 2019/0303471 | A1 | 10/2019 | Lee et al. |
| 2020/0035362 | A1 | 1/2020 | Abou Shousha et al. |
| 2020/0357490 | A1 | 11/2020 | Kartoun et al. |
| 2020/0395103 | A1 | 12/2020 | Ramakrishnan et al. |
| 2020/0411199 | A1 | 12/2020 | Shrager et al. |
| 2021/0057108 | A1 | 2/2021 | Fisher et al. |
| 2021/0117842 | A1 | 4/2021 | Smith et al. |
| 2021/0353203 | A1 | 11/2021 | Burman et al. |
| 2022/0157413 | A1 | 5/2022 | Fisher et al. |
| 2022/0172085 | A1 | 6/2022 | Fisher et al. |

FOREIGN PATENT DOCUMENTS

| | | | |
|---|---|---|---|
| EP | 3740908 | A1 | 11/2020 |
| EP | 4018394 | A1 | 6/2022 |
| JP | 2021511584 | A | 5/2021 |
| JP | 202231730 | A | 2/2022 |
| WO | 2006084196 | A2 | 8/2006 |
| WO | 2016145379 | A1 | 9/2016 |
| WO | 2019143737 | A1 | 7/2019 |
| WO | 2021041128 | A1 | 3/2021 |
| WO | 2022101809 | A1 | 5/2022 |
| WO | 2022120350 | A2 | 6/2022 |
| WO | 2022120350 | A3 | 8/2022 |
| WO | 2022187064 | A1 | 9/2022 |

OTHER PUBLICATIONS

Salakhutdinov et al., "Deep Boltzmann Machines", Proc. International Conference on Artificial Intelligence and Statistics, 2009, 8 pgs. (Year: 2009).*

López-Ruiz, et al. "Equiprobability, Entropy, Gamma Distributions and Other Geometrical Questions in Multi-Agent Systems." Entropy 2009, 11, 959-971. (Year: 2009).*

Tran, et al., "Mixed-Variate Restricted Boltzmann Machines", Asian Conference on Machine Learning, JMLR: Workshop and Conference Proceedings 20, 2011, pp. 213-229. (Year: 2011).*

Hinton, "A Practical Guide to Training Restricted Boltzmann Machines", Neural networks: Tricks of the trade, Springer, Berlin, Heidelberg, 2012, 21 pgs. (Year: 2012).*

Nguyen et al. "Latent Patient Profile Modelling and Applications with Mixed-Variate Restricted Boltzmann Machine." 2013, Advances in Knowledge Discovery and Data Mining, pp. 123-135 (Year: 2013).*

Cho et al., "Gaussian-Bernoulli deep Boltzmann machine", Proceedings of the 2013 International Joint Conference on Neural Networks (IJCNN), Dallas, Texas, Aug. 4-9, 2013, 9 pgs. (Year: 2013).*

Goodfellow et al. "Generative Adversarial Networks." 2014. arXiv:1406.2661 (Year: 2014).*

Zhang et al. "Predictive Deep Boltzmann Machine for Multiperiod Wind Speed Forecasting." 2015. IEEE Transactions on Sustainable Energy, vol. 6, Issue 4, pp. 1416-1425 (Year: 2015).*

Li et al. "Temperature based Restricted Boltzmann Machines." Jan. 13, 2016. Scientific Reports 6, 12 pages. (Year: 2016).*

Dutt et al. "Generative Adversarial Networks (GAN) Review." CVR Journal of Science and Technology, vol. 13, Dec. 2017 , pp. 1-5 (Year: 2017).*

Nguyen et al. "Supervised Restricted Boltzmann Machines." UAI. 2017. (Year: 2017).*

Lamb et al. "GibbsNet: Iterative Adversarial Inference for Deep Graphical Models", 2017, arXiv preprint arXiv:1712.04120v1, 11 pages (Year: 2017).*

Song et al. "Generative Adversarial Learning of Markov Chains", 2017, 7 pages, Accessed at URL https://openreview.net/forum?id=S1L-hCNtl (Year: 2017).*

International Search Report and Written Opinion for International Application No. PCT/US2019/013870, Search completed Mar. 18, 2019, dated Mar. 27, 2019, 9 pgs.

Akhtar et al., "Improving the Robustness of Neural Networks Using K-Support Norm Based Adversarial Training", IEEE Access; Publication [online], Dec. 28, 2016, 10 pgs.

Arici et al., "Associative Adversarial Networks", arXiv:1611.06953v1 [cs.LG], Nov. 18, 2016, 8 pgs.

Arjovsky, "Wasserstein gan," http://github.com/martinarjovsky/WassersteinGAN, 2017, 10 pgs.

Arjovsky et al., "Wasserstein Generative Adversarial Networks", Proceedings of the 34th International Conference on Machine Learning, 2017, 32 pgs.

Bengio et al., "Greedy Layer-Wise Training of Deep Networks", Advances in neural information processing systems, 2007, 13 pgs.

Cho et al., "Gaussian-Bernoulli deep Boltzmann machine", Proceedings of the 2013 International Joint Conference on Neural Networks (IJCNN), Dallas, Texas, Aug. 4-9, 2013, 9 pgs.

Gabrie et al., "Training Restricted Boltzmann Machines via the Thouless-Anderson-Palmer Free Energy", Advances in Neural Information PRocessing Systems, vol. 28, 2015, 9 pgs.

Goodfellow et al., "Generative Adversarial Nets", Advances in Neural Information Processing Systems, vol. 27, 2014, 9 pgs.

Greydanus, "Generative Adversarial Networks for the MNIST dataset", "Mnist gan," http://github.com/greydanus/mnist-gan, 2017, 2 pgs.

Hinton, "A Fast Learning Algorithm for Deep Belief Nets", Neural Computation 18, 2006, pp. 1527-1554.

Hinton, "A Practical Guide to Training Restricted Boltzmann Machines", Neural networks: Tricks of the trade, Springer, Berlin, Heidelberg, 2012, 21 pgs.

Hinton et al., "Reducing the Dimensionality of Data with Neural Networks", Science, vol. 313, No. 5786, Jul. 28, 2006, pp. 504-507.

Kullback et al., "On Information and Sufficiency", The Annals of Mathematical Statistics, vol. 22, No. 1, 1951, pp. 79-86.

Montavon et al., "Wasserstein Training of Restricted Boltzmann Machines", Advances in Neural Information Processing Systems, vol. 29, 2016, 9 pgs.

Salakhutdinov et al., "Deep Boltzmann Machines", Proc. International Conference on Artificial Intelligence and Statistics, 2009, 8 pgs.

Sutskever, et al., "The Recurrent Temporal Restricted Boltzmann Machine", Advances in Neural Information Processing Systems, 2009, 8 pgs.

Tran, et al., "Mixed-Variate Restricted Boltzmann Machines", Asian Conference on Machine Learning, JMLR: Workshop and Conference Proceedings 20, 2011, pp. 213-229.

Extended European Search Report for European Application No. 19741291.9, Search completed Sep. 8, 2021, dated Sep. 17, 2021, 12 Pgs.

International Preliminary Report on Patentability for International Application PCT/US2019/013870 Report dated Jul. 21, 2020, Mailed Jul. 30, 2020, 4 Pgs.

International Search Report and Written Opinion for International Application No. PCT/US2020/047054, Search completed Oct. 8, 2020, dated Nov. 23, 2020, 10 Pgs.

Fisher et al., "Boltzmann Encoded Adversarial Machines", Arxiv.org: 1804.08682v1, Apr. 23, 2018, XP081229135, 17 pgs.

(56) References Cited

OTHER PUBLICATIONS

Grover et al., "Flow-GAN: Combining Maximum Likelihood and Adversarial Learning in Generative Models", Arxiv.org, Cornell University Library, May 24, 2017, XP081405378, 10 pgs.
Kim et al., "Deep Directed Generative Models with Energy-Based Probability Estimation", Arxiv.org, Cornell University Library, Jun. 10, 2016, XP080707281, 9 pgs.
Liu et al., "A Survey of Deep Neural Network Architectures and their Applications", Neurocomputing, Elsevier, Dec. 18, 2016, pp. 11-26.
Miotto et al., "Deep Learning for Healthcare: Review, Opportunities and Challenges", Briefings in Bioinformatics 19, No. 6 (2017), 11 pgs.
Rogers et al., "Combining patient-level and summary-level data for Alzheimer's disease modeling and simulation: a beta regression meta-analysis", Journal of Pharmacokinetics and Pharmacodynamics 39.5 (2012), 20 pgs.
Tuzman, Karen Tkach, "Broadening role for external control arms in clinical trials", Biocentury, Tools & Techniques, reprint from Jul. 15, 2019, 5 pgs.
International Preliminary Report on Patentability for International Application PCT/US2020/047054, Report dated Feb. 17, 2022, Mailed on Mar. 3, 2022, 5 Pgs.
International Search Report and Written Opinion for International Application PCT/US2021/072678, search completed Jan. 31, 2022, dated Jul. 1, 2022, 13 Pgs.
Balzer et al., "Adaptive pair-matching in randomized trials with unbiased and efficient effect estimation", Statist. Med. 2015, vol. 34, pp. 999-1011; DOI: 10.1002/sim.6380.
Cui et al., "Multilevel Modeling and Value of Information in Clinical Trial Decision Support", BMC Systems Biology (2014) 8:6; DOI 10.1186/s12918-014-0140-0.
Karcher et al., "The "RCT augmentation": a novel simulation method to add patient heterogeneity into phase III trials", BMC Medical Research Methodology (2018) 18:75; https://doi.org/10.1186/s1287 4-018-0534-6.
Ventz et al., "Design and Evaluation of an External Control Arm Using Prior Clinical Trials and Real-World Data", Clinical Cancer Research 2019; 25:4993-5001; doi: 10.1158/1078-0432.CCR-19-0820.
Yu et al., "Assessment and adjustment of approximate inference algorithms using the law of total variance", arxiv:1911.08725v1 [stat.CO], Nov. 20, 2019, 29 pgs.

* cited by examiner t0

| ID | Test 1 | Image 1 | Test 2 | Gender |
|---|---|---|---|---|
| 1 | TRUE | V1 | -1.5 | M |
| 2 | FALSE | V2 | 1.5 | M |
| . | | | | |
| . | | | | |
| . | | | | |
| n | TRUE | Vn | 4.2 | F |

510 t1

| ID | Test 1 | Image 1 | Test 2 | Gender |
|---|---|---|---|---|
| 1 | TRUE | V1 | | M |
| 2 | FALSE | V2 | | M |
| . | | | | |
| . | | | | |
| . | | | | |
| n | TRUE | Vn | 3.5 | F |

520

.
.
.

tn

| ID | Test 1 | Image 1 | Test 2 | Gender |
|---|---|---|---|---|
| 1 | TRUE | V1 | | M |
| 2 | FALSE | V2 | 1.7 | M |
| . | | | | |
| . | | | | |
| . | | | | |
| n | TRUE | Vn | 2.8 | F |

```
model:
    type: BoltzmannMachine
    layers:
        -
            layer_type: BernoulliLayer
            num_units: 8
            center: False
            time_dependent: False
        -
            layer_type: GaussianLayer
            num_units: 5
            center: True
            time_dependent: False
```

Comparison of regular Gibbs sampling to Temperature Driven Sampling

1600

SYSTEMS AND METHODS FOR MODELING PROBABILITY DISTRIBUTIONS

CROSS-REFERENCE TO RELATED APPLICATIONS

The present application claims the benefit of and priority to U.S. Provisional Patent Application No. 62/618,440 entitled 'Systems and Methods for Modeling Probability Distributions', filed Jan. 17, 2018, and U.S. Provisional Patent Application No. 62/792,648 entitled 'Simulating Biological and Health Systems with Restricted Boltzmann Machines' filed Jan. 15, 2019. The disclosure of U.S. Provisional Patent Application Ser. Nos. 62/618,440 and 62/792,648 are herein incorporated by reference in their entirety.

FIELD OF THE INVENTION

The present invention generally relates to modeling probability distributions and more specifically relates to training and implementing a Boltzmann machine to accurately model complex probability distributions.

BACKGROUND

In a world of uncertainty, it is difficult to properly model probability distributions across multiple dimensions based on diverse and heterogeneous sets of data. For example, in the health industry, individual health outcomes are never certain. The condition of one patient with a disease may deteriorate rapidly, while another patient quickly recovers. The inherent stochasticity of individual health outcomes implies that health informatics must aim to predict health risks rather than deterministic outcomes. The ability to quantify and predict health risks has important implications for business models that depend on the health of a population.

SUMMARY OF THE INVENTION

Systems and methods for modeling complex probability distributions in accordance with embodiments of the invention are illustrated. One embodiment includes a method for training a restricted Boltzmann machine (RBM), wherein the method includes generating, from a first set of visible values, a set of hidden values in a hidden layer of a RBM and generating a second set of visible values in a visible layer of the RBM based on the generated set of hidden values. The method also includes computing a set of likelihood gradients based on at least one of the first set of visible values and the generated set of visible values, computing a set of adversarial gradients using an adversarial model based on at least one of the set of hidden values and the set of visible values and computing a set of compound gradients based on the set of likelihood gradients and the set of adversarial gradients. The method includes updating the RBM based on the set of compound gradients.

In a further embodiment, the visible layer of the RBM includes a composite layer composed of a plurality of sub-layers for different data types.

In still another embodiment, the plurality of sub-layers includes at least one of a Bernoulli layer, an Ising layer, a one-hot layer, a von Mises-Fisher layer, a Gaussian layer, a ReLU layer, a clipped ReLU layer, a student-t layer, an ordinal layer, an exponential layer, and a composite layer.

In a still further embodiment, the RBM is a deep Boltzmann machine (DBM), wherein the hidden layer is one of a plurality of hidden layers.

In yet another embodiment, the RBM is a first RBM and the hidden layer is a first hidden layer of the plurality of hidden layers. The method further includes sampling the hidden layer from the first RBM, stacking the visible layer and the hidden layer from the first RBM into a vector, training a second RBM, and generating the DBM by copying weights from the first and second RBMs to the DBM. The vector is a visible layer of the second RBM.

In a yet further embodiment, the method further includes steps for receiving a phenotype vector for a patient, using the RBM to generate a time progression of a disease, and treating the patient based on the generated time progression.

In another additional embodiment, the visible layer and the hidden layer are for a first time instance, wherein the hidden layer is further connected to a second hidden layer that incorporates data from a different second time instance.

In a further additional embodiment, the visible layer is a composite layer includes data for a plurality of different time instances.

In another embodiment again, computing the set of likelihood gradients includes performing Gibbs sampling.

In a further embodiment again, the set of compound gradients are weighted averages of the set of likelihood gradients and the set of adversarial gradients.

In still yet another embodiment, the method further includes steps for training the adversarial model by drawing data samples based on authentic data, drawing fantasy samples based from the RBM, and training the adversarial model based on the adversarial model's ability to distinguish between the data samples and the fantasy samples.

In a still yet further embodiment, training the adversarial model includes measuring a probability that a particular sample is drawn from either the authentic data or the RBM.

In still another additional embodiment, the adversarial model is one of a fully-connected classifier, a logistic regression model, a nearest neighbor classifier, and a random forest.

In a still further additional embodiment, the method further includes steps for using the RBM to generate a set of samples of a target population.

In still another embodiment again, computing a set of likelihood gradients includes computing a convex combination of a Monte Carlo estimate and a mean field estimate.

In a still further embodiment again, computing a set of likelihood gradients includes initializing a plurality of samples and initializing an inverse temperature for each sample of the plurality of samples. For each sample of the plurality of samples, computing a set of likelihood gradients further includes updating the inverse temperature by sampling from an autocorrelated Gamma distribution, and updating the sample using Gibbs sampling.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 5 illustrates data structures for implementing a generalized Boltzmann Machine in accordance with certain embodiments of the invention.

FIG. 8 illustrates a schema for implementing a generalized Boltzmann Machine in accordance with certain embodiments of the invention.

DETAILED DESCRIPTION

Figure 1:
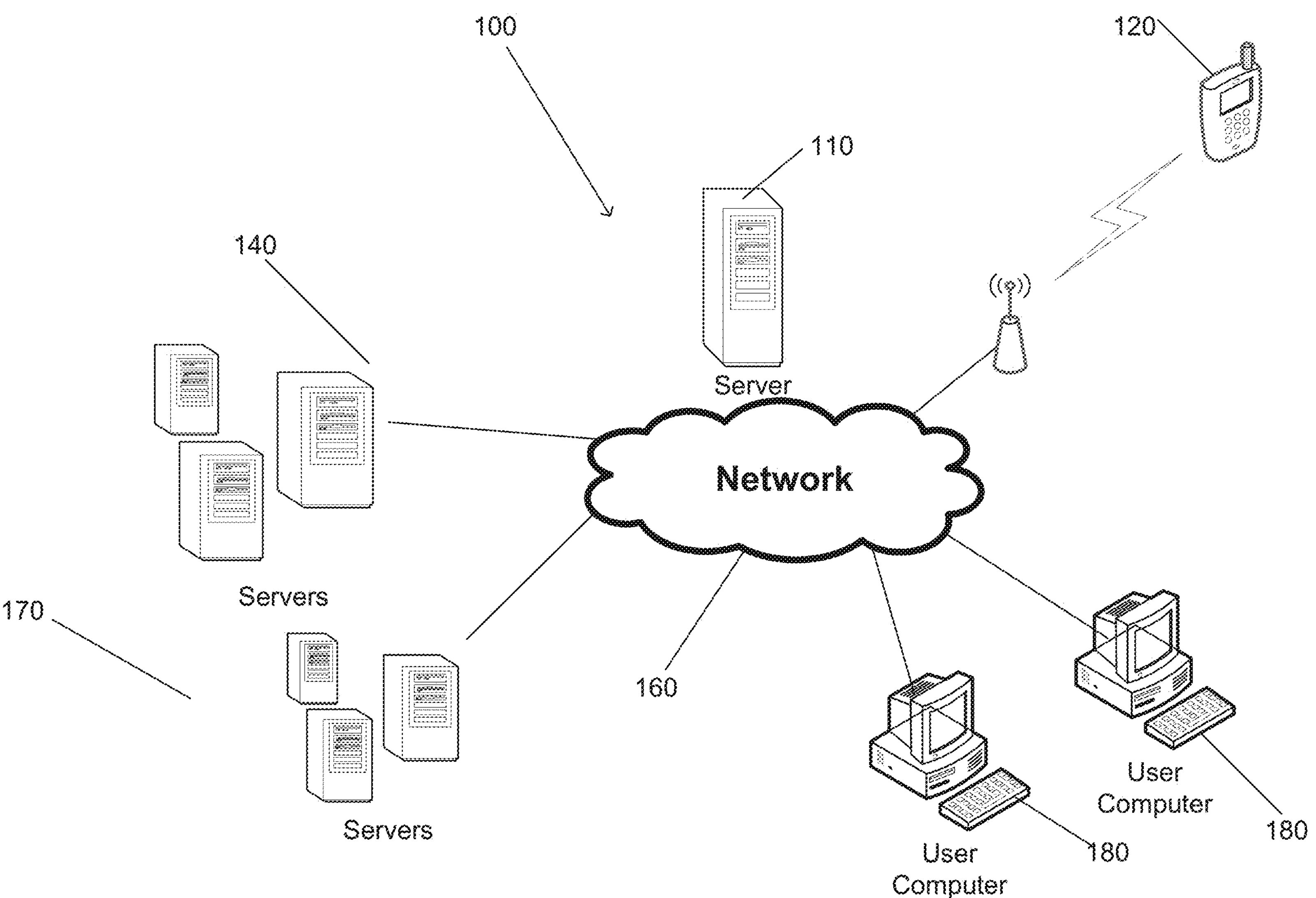
FIG. 1 illustrates a system that provides for the gathering and distribution of data for modeling probability distributions in accordance with some embodiments of the invention.

Machine learning is one potential approach to modeling complex probability distributions. In the following description, many examples are described with reference to medical applications, but one skilled in the art will recognize that techniques described herein can be readily applied in a variety of different fields including (but not limited to) health informatics, image/audio processing, marketing, sociology, and lab research. One of the most pressing problems is that one often has little, or no, labeled data that directly addresses a particular question of interest. Consider the task of predicting how a patient will respond to an investigational therapeutic in a clinical trial. In a supervised learning setting, one would give the therapeutic to many patients and observe how each patient responds. Then, one would use this data to build a model that predicts how a new patient will respond to the therapeutic. For example, a nearest neighbor classifier would look through the pool of previously treated patients to find a patient that is most similar to the new patient, then it would predict the new patient's response based on the previously treated patient's response. However, supervised learning requires significant amounts of labeled data and, particularly where sample sizes are small or labeled data is not readily available, unsupervised learning is critical to the successful application of machine learning.

Many machine learning applications, such as computer vision, require the use of homogeneous information (e.g., images of the same shape and resolution), which must be pre-processed or otherwise manipulated to normalize the input and training data. However, in many applications it is desirable to combine data of various types (e.g., images, numbers, categories, ranges, text samples, etc.) from many sources. For example, medical data can include a variety of different types of information from a variety of different sources, including (but not limited to) demographic information (e.g., a patient's age, ethnicity, etc.), diagnoses (e.g., binary codes that describe whether or not a patient has a particular disease), laboratory values (e.g., results from laboratory tests, such as blood tests), doctor's notes (e.g., hand written notes taken by a physician or entered into a medical records system), images (e.g., x-rays. CT scans, MRIs, etc.), and 'omics data (e.g., data from DNA sequencing studies that describe a patient's genetic background, the expression of his/her genes, etc.). Some of these data are binary, some are continuous, and some are categorical. Integrating all of these different types and sources of data is critical, but treating a variety of data types with traditional approaches to machine learning is quite challenging. Typically, the data have to be heavily pre-processed so that all of the features used for machine learning are of the same type. Data pre-processing steps can take up a large portion of an analyst's time in training and implementing a machine learning model.

In addition to processing many different types of data, the data used for an analysis is often incomplete or irregular. In the example of medical data, physicians often do not run the same set of tests on every patient (though, clinical trials are an important exception). Instead, a doctor will order a test if he/she has a specific concern about the patient. Therefore, medical records contain many fields with missing observations. But, these observations may not be missing at random. Handling these missing observations is an important part of any application of machine learning in health care.

There are two implications of missing data for machine learning in healthcare. First, any algorithm needs to be able to learn from data where there are missing observations in the training set. Second, the algorithm needs to be able to make predictions even when it is only presented with a subset of input observations. That is, one needs to be able to express any conditional relationship from the joint probability distribution.

One approach that has recently gained a lot of popularity is the use of Generative Adversarial Networks (GANs). GANs, in their traditional formulation, use a generator that transforms random Gaussian noise into a visible vector through a feed-forward neural network. Models with this formulation can be trained using the standard back-propagation process. However, GAN training tends to be unstable—requiring a careful balance between training of the generator and the discriminator (or critic). Moreover, it is not possible to generate samples from arbitrary conditional distributions with GANs, and it can be very difficult to apply GANs to problems involving heterogeneous datasets with different data types and missing observations.

Many embodiments of the invention provide novel and innovative systems and methods for the use of heterogeneous, irregular, and unlabeled data to train and implement stochastic, unsupervised machine learning models of complex probability distributions.

System for Modeling Probability Distributions

Turning now to the drawings, a system that provides for the gathering and distribution of data for modeling probability distributions in accordance with some embodiments of the invention is shown in FIG. 1. Network 100 includes a communications network 160. The communications network 160 is a network such as the Internet that allows devices connected to the network 160 to communicate with other connected devices. Server systems 110, 140, and 170 are connected to the network 160. Each of the server systems 110, 140, and 170 is a group of one or more servers communicatively connected to one another via internal networks that execute processes that provide cloud services to users over the network 160. For purposes of this discussion, cloud services are one or more applications that are executed by one or more server systems to provide data and/or executable applications to devices over a network. The server systems 110, 140, and 170 are shown each having three servers in the internal network. However, the server systems 110, 140 and 170 may include any number of servers and any additional number of server systems may be connected to the network 160 to provide cloud services. In accordance with various embodiments of this invention, a network that uses systems and methods that model complex probability distributions in accordance with an embodiment of the invention may be provided by a process (or a set of processes) being executed on a single server system and/or a group of server systems communicating over network 160.

Users may use personal devices 180 and 120 that connect to the network 160 to perform processes for providing and/or interaction with a network that uses systems and methods that model complex probability distributions in accordance with various embodiments of the invention. In the shown embodiment, the personal devices 180 are shown as desktop computers that are connected via a conventional "wired" connection to the network 160. However, the personal device 180 may be a desktop computer, a laptop computer, a smart television, an entertainment gaming console, or any other device that connects to the network 160 via a "wired" connection. The mobile device 120 connects to network 160 using a wireless connection. A wireless connection is a connection that uses Radio Frequency (RF) signals, Infrared signals, or any other form of wireless signaling to connect to the network 160. In FIG. 1, the mobile device 120 is a mobile telephone. However, mobile device 120 may be a mobile phone. Personal Digital Assistant (PDA), a tablet, a smartphone, or any other type of device that connects to network 160 via wireless connection without departing from this invention.

Figure 2:
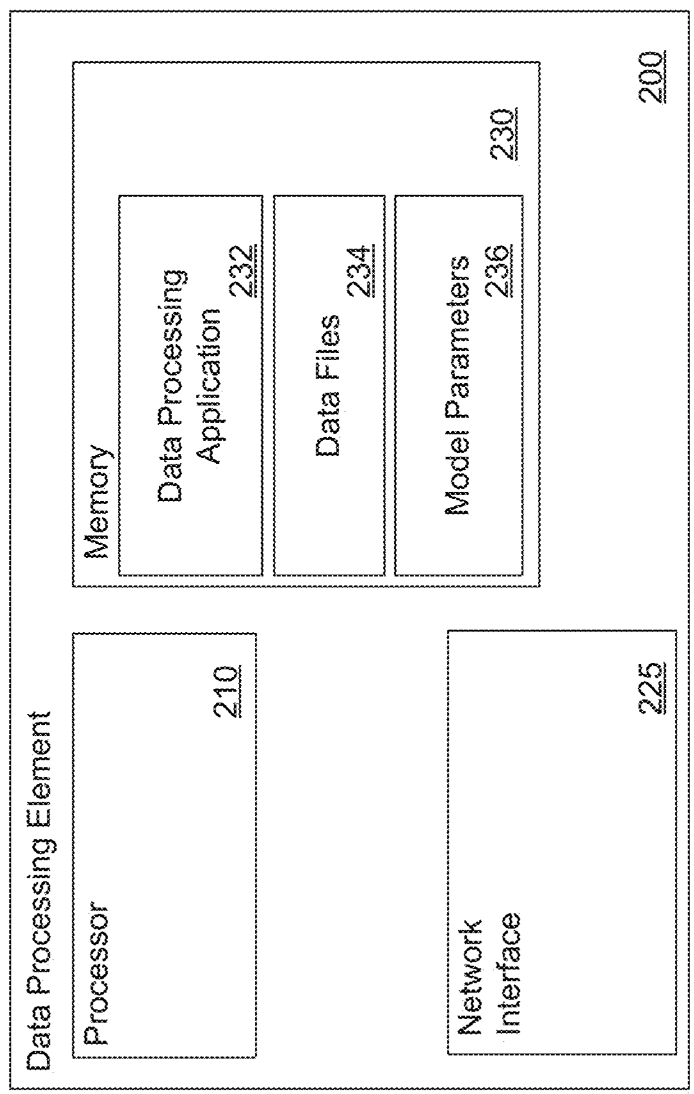
FIG. 2 illustrates a data processing element for training and utilizing a stochastic model.

A data processing element for training and utilizing a stochastic model in accordance with a number of embodiments is illustrated in FIG. 2. In various embodiments, data processing element 200 is one or more of a server system and/or personal devices within a networked system similar to the system described with reference to FIG. 1. Data processing element 200 includes a processor (or set of processors) 210, network interface 225, and memory 230. The network interface 225 is capable of sending and receiving data across a network over a network connection. In a number of embodiments, the network interface 225 is in communication with the memory 230. In several embodiments, memory 230 is any form of storage configured to store a variety of data, including, but not limited to, a data processing application 232, data files 234, and model parameters 236. Data processing application 232 in accordance with some embodiments of the invention directs the processor 210 to perform a variety of processes, such as (but not limited to) using data from data files 234 to update model parameters 236 in order to model complex probability distributions.

Figure 3:
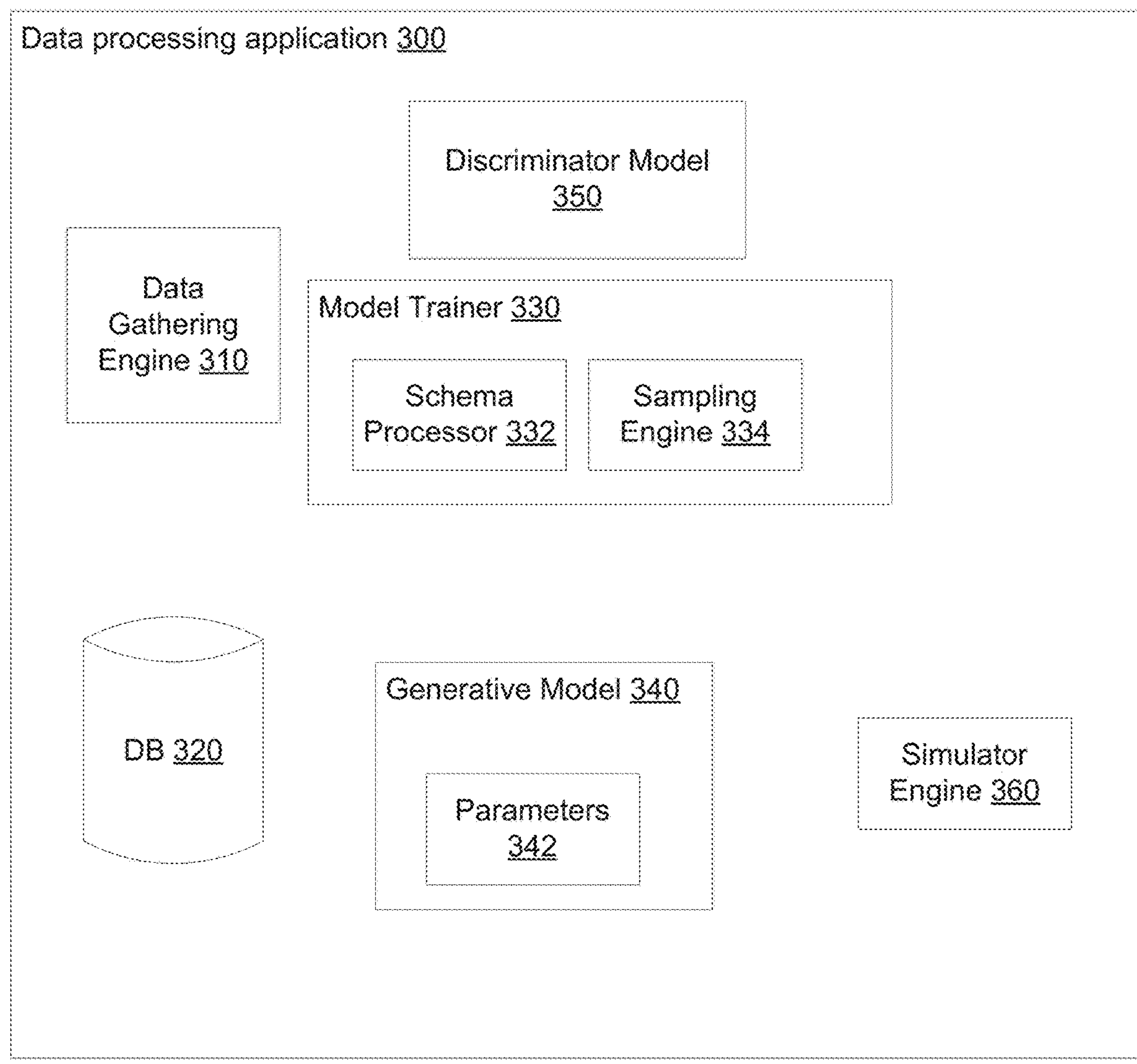
FIG. 3 illustrates a data processing application for training and utilizing a stochastic model.

A data processing application in accordance with a number of embodiments of the invention is illustrated in FIG. 3. In this example, data processing element 300 includes a data gathering engine 310, database 320, a model trainer 330, a generative model 340, a discriminator model 350, and a simulator engine 360. Model trainer 330 includes a schema processor 332 and a sampling engine 334. Data processing applications in accordance with many embodiments of the invention process data to train stochastic models that can be used to model complex probability distributions.

Data gathering engines in accordance with many embodiments of the invention gather data from various sources in various formats. The gathered data in accordance with many embodiments of the invention include data that may be heterogeneous (e.g., data with various types, ranges, and constraints) and/or incomplete. One skilled in the art will recognize that various types and amounts of data can be utilized as appropriate to the requirements of specific applications in accordance with embodiments of the invention. In some embodiments, data gathering engines are further for pre-processing the data to facilitate the training of the model. However, unlike pre-processing performed in other methods, pre-processing in accordance with some embodiments of the invention is automatically performed based on a datatype and/or a schema associated with each data input. For example, in certain embodiments, bodies of unstructured text (e.g., typed medical notes, diagnoses, free-form questionnaire responses, etc.) are processed in a variety of ways, such as (but not limited to) vectorization (e.g., using word2vec), summarization, sentiment analysis, and/or keyword analysis. Other pre-processing steps can include (but are not limited to) normalization, smoothing, filtering, and aggregation. In some embodiments, the pre-processing is performed using various machine learning techniques, including (but not limited to) Restricted Boltzmann machines, support vector machines, recurrent neural networks, and convolutional neural networks.

Databases in accordance with various embodiments of the invention store data for use by data processing applications, including (but not limited to) input data, pre-processed data, model parameters, schemas, output data, and simulated data. In some embodiments, databases are located on separate machines (e.g., in cloud storage, server farms, networked databases, etc.) from a data processing application.

Model trainers in accordance with a number of embodiments of the invention are used to train generative and/or discriminator models. In many embodiments, model trainers utilize schema processors to build the generator and/or discriminator models based on schemas that are defined for the various data available to the system. Schema processors in accordance with some embodiments of the invention build composite layers for a generative model (e.g., restricted Boltzmann machine) that are made up of several different layers for handling different types of data in different ways. In some embodiments, model trainers train the generative and discriminator models by optimizing a compound objective function based on a log-likelihood and adversarial objectives. Training generative models in accordance with certain embodiments of the invention utilizes sampling engines to draw samples from the models to measure the probability distributions of the data and/or the models. Various methods for sampling from such models to train and/or draw generated samples from a model are described in greater detail below.

In many embodiments, generative models are trained to model complex probability distributions, which can be used to generate predictions/simulations of various probability distributions. Discriminator models discriminate between data-based samples and model-generated samples based on the visible and/or hidden states.

Simulator engines in accordance with several embodiments of the invention are used to generate simulations of complex probability distributions. In some embodiments, simulator engines are used to simulate patient populations, disease progressions, and/or predicted responses to various treatments. Simulator engines in accordance with several embodiments of the invention use a sampling engine for drawing samples from the generative models that simulate the probability distribution of the data.

As described above, as a part of the data gathering process, the data in accordance with several embodiments of the invention is pre-processed in order to simplify the data. Unlike other pre-processing which is often highly manual and specific to the data, this can be performed automatically based on the type of data, without additional input from another person.

Figure 4:
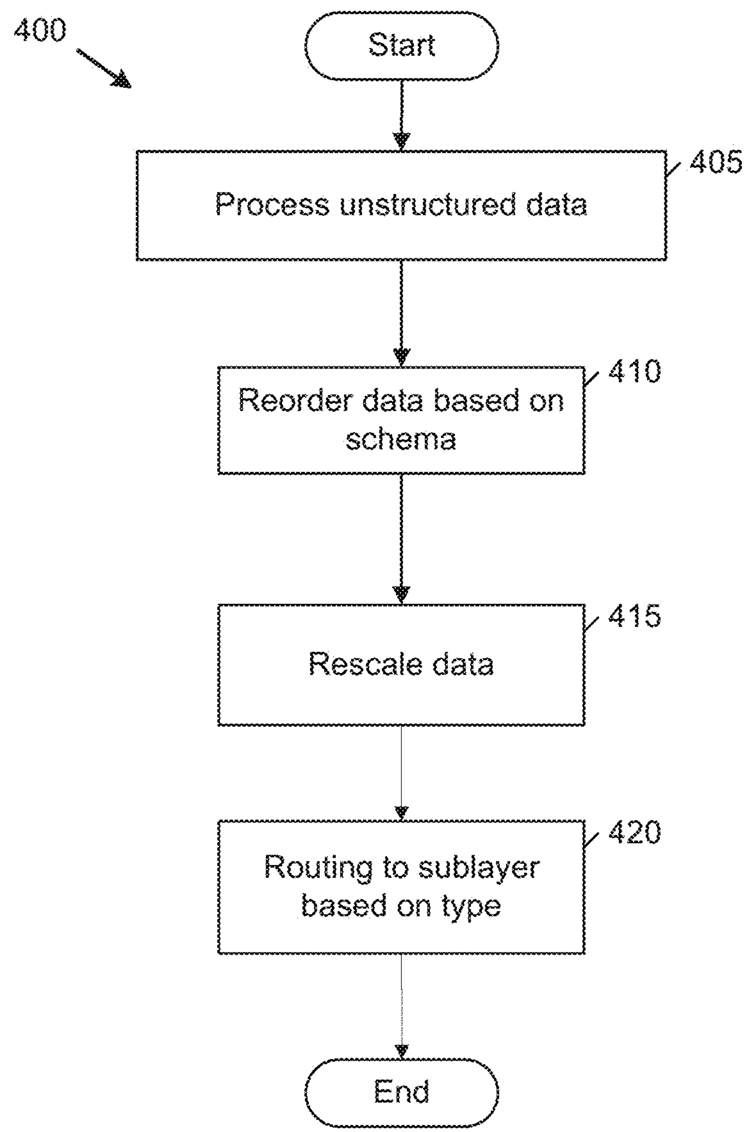
FIG. 4 conceptually illustrates a process for preparing data for analysis.

A process for preparing data for analysis in accordance with some embodiments of the invention is conceptually illustrated in FIG. 4. The process 400 processes (405) unstructured data. Unstructured data in accordance with many embodiments of the invention can include various types of data that can be pre-processed in order to speed up processing and/or to reduce the memory requirements for storing the relevant data. Examples of such data can include (but are not limited to) bodies of text, signal processing data, audio data, and image data. Processing unstructured data in accordance with many embodiments of the invention can include (but is not limited to) feature identification, summarization, keyword detection, sentiment analysis, and signal analysis.

The process 400 reorders (410) the data based on a schema. In certain embodiments, processes reorder the data based on the different data types defined in schemas by grouping similar data types to allow for efficient processing of the data types. The process 400 in accordance with some embodiments of the invention rescales (415) the data to prevent the overrepresentation of certain data elements based purely on the scale of the measurements. Process 400 then routes (420) the pre-processed data to the sublayers of a Boltzmann machine that are structured based on data types identified in the schema. Examples of Boltzmann machine structures and architectures are described in greater detail below. In some embodiments, the data is pre-processed into temporally sequenced data structures for inputs to a deep temporal Boltzmann machine. Deep temporal Boltzmann machines are described in further detail below.

Temporal data structures for inputs to a Boltzmann machine in accordance with a number of embodiments of the invention are illustrated in FIG. 5. The example of FIG. 5 shows three data structures 510, 520, and 530. Each of the data structures represents a set of the data values captured at a particular time (i.e., times t0, t1, and tn). In this example, certain traits (e.g., gender, ethnicity, birthdate, etc.) do not usually change over time, while other characteristics (e.g., test results, medical scans, etc.) do change over time. The example further shows that certain data may be missing for some fields for certain times for certain individuals. In this example, each individual is assigned a separate identification number in order to maintain patient confidential information.

Boltzmann Encoded Adversarial Machines

Figure 6:
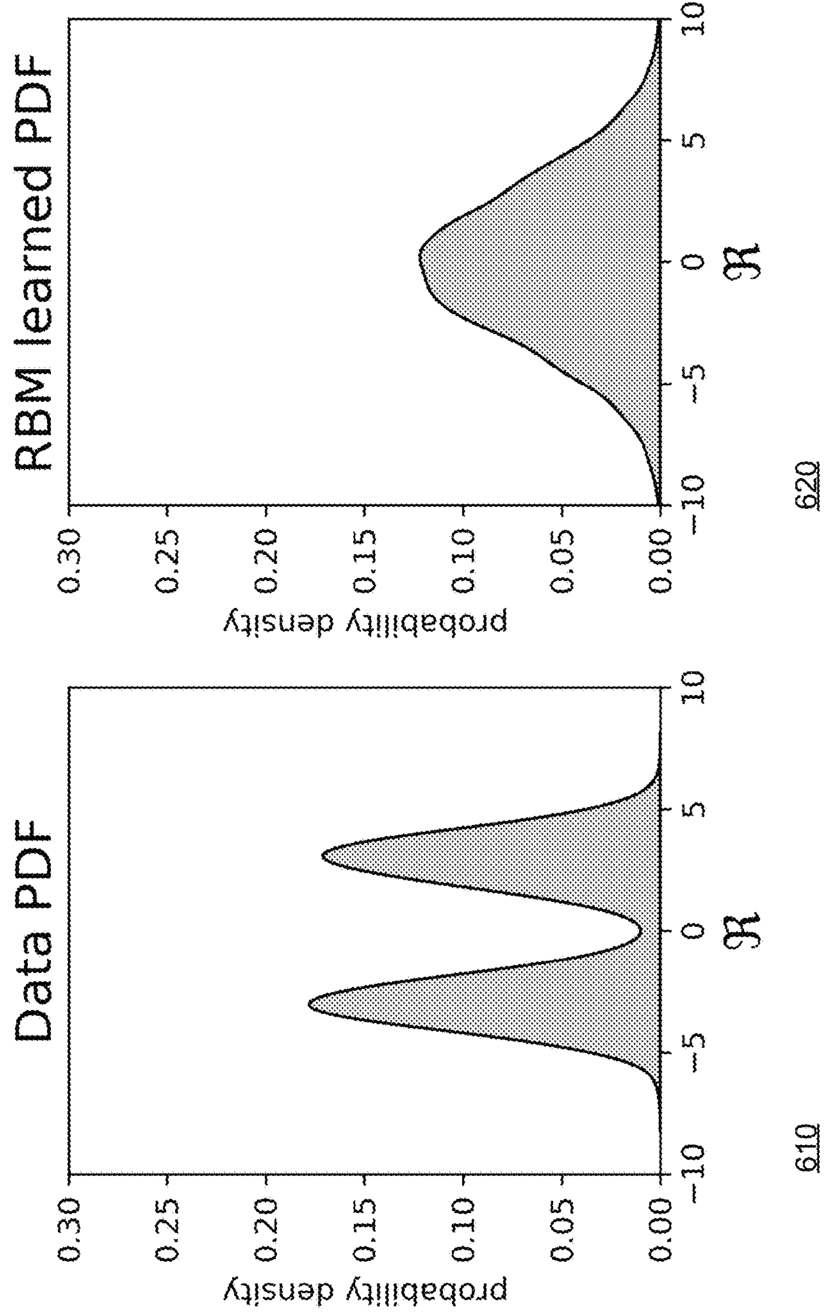
FIG. 6 illustrates a bimodal distribution and a smoothed, spread distribution that is learned by a RBM distribution in accordance with several embodiments of the invention.

Models trained to minimize forward KL divergence, $D_{KL}(p_{data}\|p_\theta)$, tend to spread the model distribution out to cover the support of the data distribution. An example of a spread distribution is illustrated in FIG. 6. Specifically, FIG. 6 illustrates a bimodal distribution 610 and the pretty good, smoothed, spread distribution that is learned by a RBM distribution 620. While RBMs are able to generate such good approximations, they can struggle when faced with finer, more complex distributions.

To overcome the problems with traditional Boltzmann machines, several embodiments of the invention implement a framework for training Boltzmann machines against an adversary, referred to herein as a Boltzmann Encoded Adversarial Machine (BEAM). A BEAM minimizes a loss function that is a combination of the negative log-likelihood and an adversarial loss. The adversarial component ensures that BEAM training performs a simultaneous minimization of both the forward and reverse KL divergences, which prevents the oversmoothing problem observed with regular RBMs.

Boltzmann Machine Architectures

With many traditional machine learning techniques, supervised learning is used to train a model on a large set of labeled data to make predictions and classifications. However, in many cases, it is not feasible or possible to gather such large samples of labeled data. In many cases, the data cannot be readily labeled or there are simply not enough samples of an event to meaningfully train a supervised learning model. For example, clinical trials often face difficulties in gathering such labeled data. A clinical trial typically proceeds through three main phases. In phase I, the therapeutic is given to healthy volunteers to assess it's safety. In phase II, the therapeutic is given to approximately 100 patients to obtain initial estimates for safety and efficacy. Finally, in phase III, the therapeutic is given to a few hundred to a few thousand patients to rigorously investigate the efficacy of the drug. Before phase II, there is no in-human data on the effect of the investigational drug for the desired indication, making supervised learning impossible. After phase II, there is some in-human data on the effect of the investigational drug, but the sample size is quite limited, rendering supervised learning techniques ineffective. For comparison, a phase II clinical trial may have 100-200 patients, whereas a typical application of machine learning in computer vision may use millions of labeled images. As with many situations with limited data, the lack of large labeled datasets for many important problems implies that health informatics must heavily rely on methods for unsupervised learning.

Restricted Boltzmann Machines (RBMs)

One machine learning model (or method) that uses unsupervised learning is a Restricted Boltzmann Machine (RBM). RBMs are bidirectional neural networks, where the neurons (also called units) are divided into two layers, a visible layer and a hidden layer. The visible layer v describes the observed data. The hidden layer h consists of a set of unobserved latent variables that capture the interactions between the visible units. The model describes the joint probability distribution of v and h using an exponential form, $$p(v,h)=Z^{-1}e^{-E(v,h)}, \tag{1}$$

Here, E(v,h) is called the energy function, and $Z=\int dv dh e^{-E(v,h)}$ is called the partition function. In many embodiments, processes use the integral operator. ∫dx, to denote both standard integration or a sum over all of the elements in a discrete set.

In a traditional RBM, both the visible and hidden units are binary. Each can only take on the values 0 or 1. The energy function can be written as, $$E(v, h) = -\sum_i a_i v_i - \sum_\mu b_\mu h_\mu - \sum_{i\mu} W_{i\mu} v_i h_\mu \tag{2}$$

or, in vector notation, $E(v,h)=-a^T v-b^T h-v^T Wh$. Notice that visible units interact with the hidden units through the weights, W. However, there are no visible-visible or hidden-hidden interactions.

A key feature of an RBM is that it is easy to compute the conditional probabilities, $$p(v \mid h) = \prod_i \frac{e^{(a_i+\Sigma_\mu W_{i\mu}h_\mu)v_i}}{1+e^{a_i+\Sigma_\mu W_{i\mu}h_\mu}} \tag{3}$$

and, $$p(h \mid v) = \prod_\mu \frac{e^{(b_\mu+\Sigma_i W_{i\mu}v_i)h_\mu}}{1+e^{b_\mu+\Sigma_i W_{i\mu}v_i}}. \tag{4}$$

Similarly, it is easy to compute the conditional moments.

$$\langle v \rangle_{p(v|h)} = \frac{1}{1+e^{-(a+Wh)}} \tag{5}$$

and, $$\langle h \rangle_{p(h|v)} = \frac{1}{1+e^{-(b+W^T v)}}. \tag{6}$$

However, it is generally very difficult to compute statistics from the joint distribution. As a result, statistics from the joint distribution have to be estimated using random sampling processes such as Markov Chain Monte Carlo (MCMC).

RBMs can be trained by maximizing the log-likelihood $\langle :=\mathcal{L} \log p(v)\rangle_{data} = \langle \log\int dh p(v,h)\rangle_{data}$. Here, $\langle \bullet \rangle_{data}$ denotes a average over all of the observed samples. The derivative of the log-likelihood with respect to some parameter of the model θ is:

$$\begin{aligned}\frac{\partial \mathcal{L}}{\partial a} &= \left\langle \frac{\partial}{\partial \theta} \log \int dh p(v, h) \right\rangle_{data} \\ &= \left\langle \frac{\partial}{\partial \theta} \log \int dh e^{-E(v,h)} \right\rangle_{data} - \frac{\partial}{\partial \theta} \log Z \\ &= \left\langle \frac{\int dh e^{-E(v,h)}\left(-\frac{\partial E}{\partial \theta}\right)}{\int dh e^{-E(v,h)}} \right\rangle_{data} - \frac{\int dv dh e^{-E(v,h)}\left(-\frac{\partial E}{\partial \theta}\right)}{\int dv dh e^{-E(v,h)}}\end{aligned} \tag{7}$$

-continued $$= \left\langle \frac{\partial E}{\partial \theta} \right\rangle_{p(v,h)} - \left\langle \left\langle \frac{\partial E}{\partial \theta} \right\rangle_{p(h|v)} \right\rangle_{data}$$

In the standard formulation of an RBM, there are three parameters a, b, and W. The derivatives are:

$$\begin{aligned}\frac{\partial \mathcal{L}}{\partial a} &= \langle v \rangle_{p(v,h)} - \langle v \rangle_{data} \\ \frac{\partial \mathcal{L}}{\partial b} &= \langle h \rangle_{p(v,h)} - \langle \langle h \rangle_{p(h|v)} \rangle_{data} \\ \frac{\partial \mathcal{L}}{\partial W} &= \langle vh^T \rangle_{p(v,h)} - \langle \langle hh^T \rangle_{p(h|v)} \rangle_{data}\end{aligned} \tag{8}$$

Computing expectations from the joint distribution is generally computationally intractable. Therefore, the derivatives have to be computed using samples from the model drawn with an MCMC process. Samples can be drawn from an RBM using alternating Gibbs sampling.

```
Input: Initial configuration (v,h).
A number of Monte Carlo steps, k.
An RBM.
Output: A new configuration (v',h').
set v0 = v, h0 = h;
for i = 1,...,k do
 |  draw hi ~ p(h|vi-1);
 |  draw vi ~ p(v|hi);
end
return (vk,hk)
```

In theory, Gibbs sampling produces uncorrelated random samples from p(v,h) in the limit that n→∞. Of course, infinity is a long time. Therefore, the derivatives of the log-likelihood of an RBM are usually approximated using one of two processes: Contrastive Divergence (CD), or Persistent Contrastive Divergence (PCD). K-step CD is very simple: Grab a batch of data. Compute an approximate batch of samples from the model by running k-steps of Gibbs sampling starting from the data. Compute the gradients of the log-likelihood and update the model parameters. Importantly, the samples from the model are re-initialized using the batch of observed data for each gradient update. K-step PCD is similar: First, samples from the model are initialized using a batch of data. The samples are updated for k steps, the gradients are computed, and the parameters are updated. In contrast to CD, the samples from the model are never re-initialized. Many architectures of Boltzmann machines in accordance with several embodiments of the invention utilize sampling to compute derivatives for training the Boltzmann machines. Various methods for sampling in accordance with several embodiments of the invention are described in greater detail below.

Generalized RBMs

Figure 7:
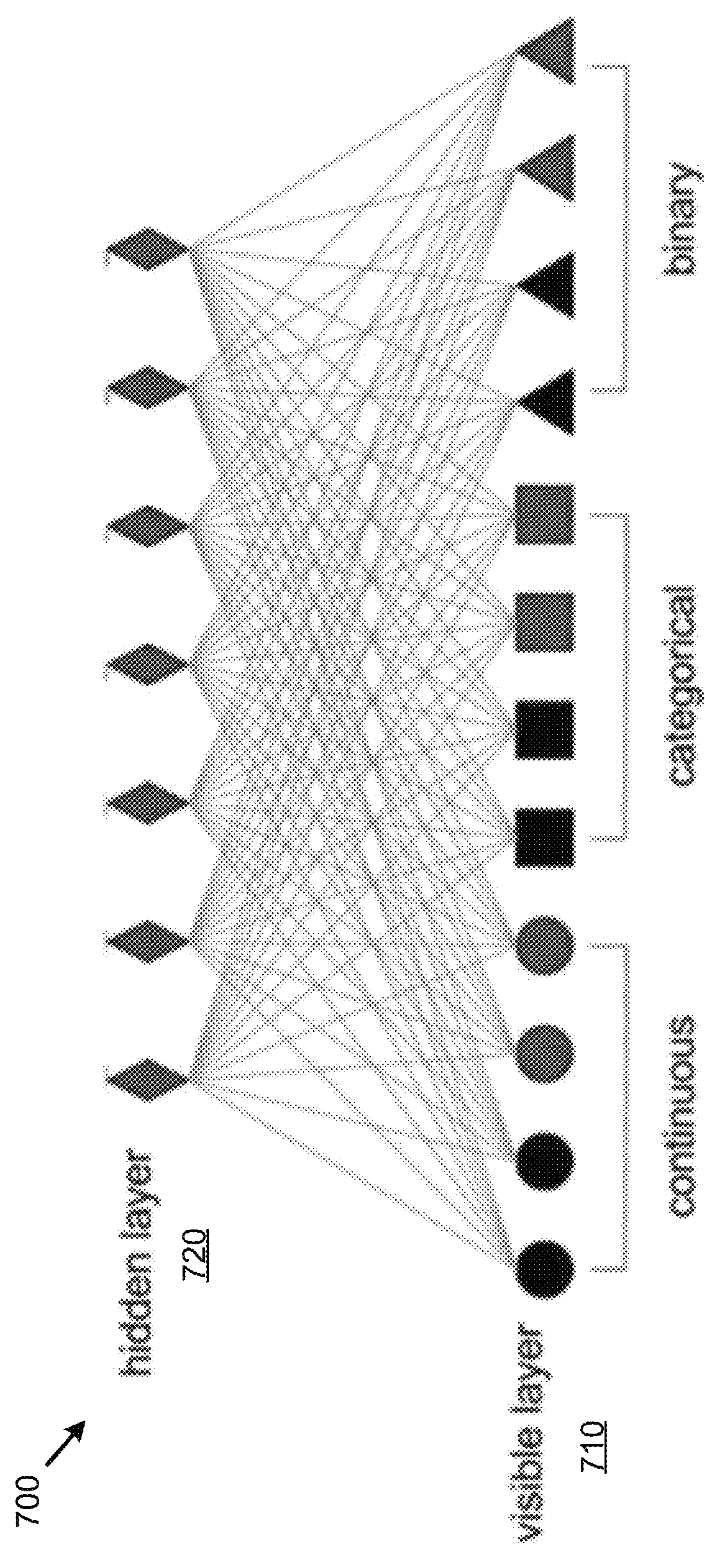
FIG. 7 illustrates an architecture for a generalized Restricted Boltzmann Machine in accordance with some embodiments of the invention.

One challenge that arises in the use of traditional Boltzmann machines is that many RBMs use binary units, while much of the data that is to be processed can come in a variety of different forms. To overcome this limitation, some embodiments of the invention use a generalized RBM. A generalized RBM in accordance with a number of embodiments of the invention is illustrated in FIG. 7. The example of FIG. 7 shows a generalized RBM 700 with a visible layer 710 and a hidden layer 720. The visible layer 710 is a composite layer comprised of several nodes of various types (i.e., continuous, categorical, and binary). The nodes of visible layer 710 are connected to nodes of hidden layer 720. Hidden layers of generalized RBMs in accordance with several embodiments of the invention operate as a low dimensional representation of individuals (e.g., patients in a clinical trial) based on the compiled inputs to a composite visible layer.

Generalized RBMs in accordance with a number of embodiments of the invention are trained with an energy function.

$$E(v,h) = -a(v) - b(h) - v^T \frac{W}{(\sigma\varepsilon^T)^2} h \tag{9}$$

where a(•) and b(•) are arbitrary functions, and $\sigma>0$ and $\varepsilon>0$ are scale parameters of the visible and hidden layers, respectively. Different functions (called layer types) are used to represent different types of data. Examples of layer types used for modeling various types of data are described below.

Bernoulli Layer: A Bernoulli layer is used to represent binary data $v_i \in \{0, 1\}$. The bias function is $a(v)=a^T v$ and the scale parameters are set to $\sigma_i=1$.

Ising Layer: An Ising layer is a symmetrized Bernoulli layer for visible units $v_i \in \{-1, +1\}$. The bias function is $a(v)=a^T v$ and the scale parameters are set to $\sigma_i=1$.

One-hot Layer: A one-hot layer represents data where $v_i \in \{0, 1\}$ and $\Sigma_i v_i=1$. That is, one of the units is turned on and all of the other units are turned off. One-hot layers are commonly used to represent categorical variables. The bias function is $a(v)=a^T v$ and the scale parameters are set to $\sigma_i=1$.

von Mises-Fisher Layer: A von Mises-Fisher layer represents data where $v_i \in [0, 1]$ and $\Sigma_i v_i^2=1$. That is, the units are confined to the surface of an n-dimensional sphere. This layer is particularly useful for modeling fractional data where $x_i \in [0, 1]$ and $\Sigma_i x_i=1$ because $v_i=\sqrt{x_i}$ satisfies the spherical property. The bias function is $a(v)=a^T v$ and the scale parameters are set to $\sigma_i=1$.

Gaussian Layer: A Gaussian layer represents data where $v_i \in \mathbb{R}$. The bias function is $$a(v) = -\sum_i \frac{(v_i - \overline{v}_i)^2}{2\sigma_i^2}.$$

Both the location, $\overline{v}_i$, and scale, $\sigma_i$, parameters of the layer are generally trainable. In practice, it helps to parameterize the model in terms of log $\sigma_i$ to ensure that the scale parameter stays positive.

ReLU Layer: A Rectified Linear Unit (ReLU) layer represents data where $v_i \in \mathbb{R}$ with $v_i \geq v_i^{low}$. In the context of a Boltzmann machine, a ReLU layer is essentially a one-sided truncated Gaussian layer. The bias function is $$a(v) = -\sum_i \frac{(v_i - \overline{v}_i)^2}{2\sigma_i^2}$$

over the domain $v_i \geq v_i^{low}$. Both the location, $\overline{v}_i$, and scale, $\sigma_i$, parameters of the layer are generally trainable whereas $v_i^{low}$ is typically specified before training. In practice, it helps to parameterize the model in terms of log $\sigma_i$ to ensure that the scale parameter stays positive.

Clipped Relu Layer: A Clipped Rectified Linear Unit (ReLU) layer represents data where $v_i \in \mathbb{R}$ with $v_i^{high} \leq v_i \geq v_i^{low}$. In the context of a Boltzmann machine, a Clipped ReLU layer is essentially a two-sided truncated Gaussian layer. The bias function is $$a(v) = -\sum_i \frac{(v_i - \overline{v}_i)^2}{2\sigma_i^2}$$

domain $v_i^{high} \leq v_i \geq v_i^{low}$. Both the location, $\overline{v}_i$, and scale, $\sigma_i$, parameters of the layer are generally trainable whereas $v_i^{high}$ and $v_i^{low}$ are typically specified before training. In practice, it helps to parameterize the model in terms of log $\sigma_i$ to ensure that the scale parameter stays positive.

Student-t Layer: A Student-t distribution is similar to a Gaussian distribution, but has fatter tails. In a variety of embodiments, implementation of a Student-t layer is implicit. The layer has three parameters, a location parameter $\overline{v}_i$ that controls the mean, a scale parameter $v_i$ that controls the variance, and a degrees of freedom parameter di that controls the thickness of the tails. The layer is defined by drawing a variance $\sigma_i^2$~InverseGamma $$\left(\frac{d_i}{2}, \frac{d_i}{2v_i}\right)$$

and then taking the energy as $$a(v) = -\sum_i \frac{(v_i - \overline{v}_i)^2}{2\sigma_i^2}.$$

Ordinal Layer: An Ordinal layer is a generalization of a Bernoulli layer that is used to represent integer valued data $v_i \in \{0, N_i\}$. The bias function is $a(v)=a^T v$ and the scale parameters are set to $\sigma_i=1$. The upper value $N_i$ is specified ahead of time.

Gaussian-Ordinal Layer: A Gaussian-ordinal layer is a generalization of an ordinal layer that is used to represent integer valued data $v_i \in \{0, N_i\}$ with a more flexible distribution. The bias function is $$a(v) = -\sum_i \frac{(v_i - \overline{v}_i)^2}{2\sigma_i^2}.$$

The upper value $N_i$ is specified ahead of time.

Exponential Layer. An exponential layer represents data where $v_i \in \mathbb{R}_+$. The bias function is $a(v)=a^T v$ and the scale parameters are set to $\sigma_i=1$. Note, exponential layers have some constraints because $a_i+\Sigma_i W_{i\mu} h_\mu>0$ for all values of the connected hidden units. Typically, this limits the types of layers that can be connected to an exponential layer, and requires ensuring that all of the weights are positive.

Composite Layer: A composite layer is not a mathematical object per se as was the case for the previously described layer types. Instead, a composite layer is a software implementation for combining multiple sub-layers of different types to create a meta-layer that can model heterogeneous data.

Specific examples of layers for modeling data in accordance with embodiments of the invention are described above; however, one skilled in the art will recognize that any number of processes can be utilized as appropriate to the requirements of specific applications in accordance with embodiments of the invention.

Schema

A schema 800 in accordance with several embodiments of the invention is conceptually illustrated in FIG. 8. Schema 800 includes descriptions of different layers of a generalized RBM. A schema allows for a model to be tuned to handle particular types of data, without requiring burdensome preprocessing by a person. The different layers allow for heterogeneous data of different types that may be incomplete and/or irregular.

Specific examples of a schema for building models in accordance with embodiments of the invention are described above; however, one skilled in the art will recognize that any number of processes can be utilized as appropriate to the requirements of specific applications in accordance with embodiments of the invention.

Generalized Deep Boltzmann Machines (DBMs)

Deep learning refers to an approach to machine learning where the model processes the data through a series of transformations. The goal is to enable the model to learn to construct appropriate features rather than requiring the researcher to craft features using prior knowledge.

Figure 9:
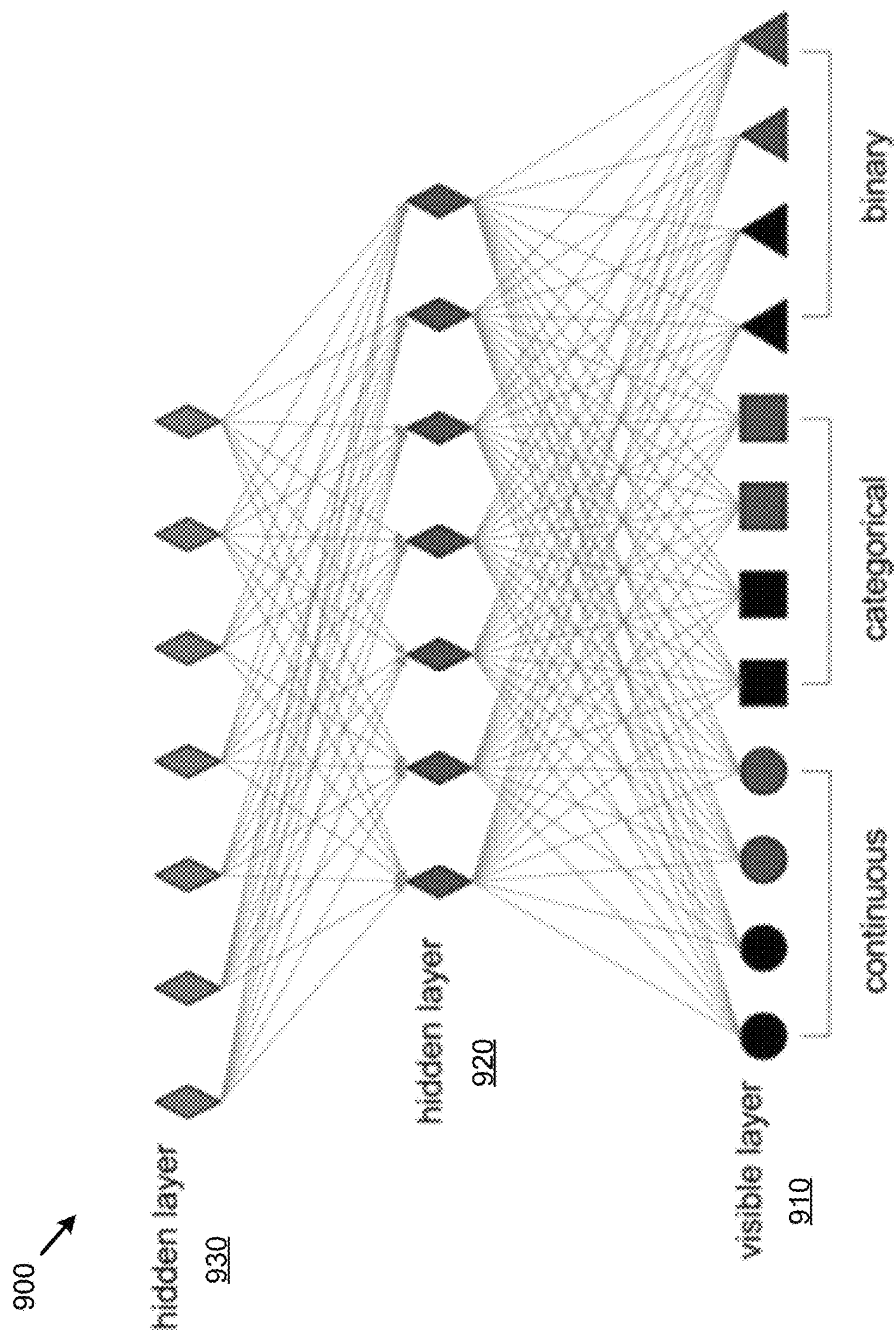
FIG. 9 illustrates an architecture for a generalized Deep Boltzmann Machine in accordance with certain embodiments of the invention.

A generalized Deep Boltzmann Machine (DBM) is essentially a stack of RBMs. A generalized DBM in accordance with some embodiments of the invention is illustrated in FIG. 9. The generalized DBM 900 shows a visible layer 910 connected to a hidden layer 920. Hidden layer 920 is further connected to another hidden layer 930. The visible layer 910 is encoded to hidden layer 920, which then operates like a visible layer for the next hidden layer 930.

Consider a DBM with L hidden layers $h_l$ for l=1, . . . , L. The energy function of the DBM is:

$$E(v, h_1, \dots, h_L) = -a(v) - \sum_{l=1}^{l=L} b_l(h_l) - v^T \frac{W}{(\sigma\varepsilon_1^T)^2} h_1 - \sum_{l=1}^{l=L-1} h_l^T \frac{W_l}{(\varepsilon_l \varepsilon_{l+1}^T)^2} h_{l+1} \tag{10}$$

A DBM can, in principle, be trained in the same way as an RBM. However, in practice. DBMs are often trained using a greedy layer-wise process. Examples of greedy layer-wise process are described in R. Salakhutdinov and G. Hinton, in *Artificial Intelligence and Statistics* (2009) pp. 448-455, which is incorporated by reference herein. In essence, forward layerwise training of a DBM proceeds by training a sequence of RBMs with energy functions:

$$E(v, h_1) = -a(v) - b_1(h_1) - v^T \frac{W}{(\sigma\varepsilon_1^T)^2} h_1$$

$$E(h_1, h_2) = -b_1(h_1) - b_2(h_2) - h_1^T \frac{W_1}{(\varepsilon_1 \varepsilon_2^T)^2} h_2$$

$$\vdots$$

$$E(h_{L-1}, h_L) = -b_{L-1}(h_{L-1}) - b_L(h_L) - h_{L-1}^T \frac{W_{L1}}{(\varepsilon_{L-1} \varepsilon_L^T)^2} h_L$$

where the outputs of the previous RBM are used as the inputs of the next RBM. It can be difficult to get information from the data distribution to propagate into the deep layers of the model when training a DBM in this forward layerwise way. As a result, it is generally difficult to train DBMs with more than a couple of hidden layers.

To overcome the limitations with forward layerwise training of DBMs, methods in accordance with many embodiments of the invention train DBMs in reverse—starting with the deepest hidden layer ht and working backwards towards v. This ensures that the deepest hidden layer must contain as much information about the visible layer as possible. The reverse layerwise training procedure makes use of the fact that a three layer DBM with connectivity v-$h_1$-$h_2$ is the same as a two layer RBM with connectivity [v,$h_2$]-$h_1$, allowing RBMs with Composite Layers to talk backwards down the connectivity graph of the DBM.

Figure 10:
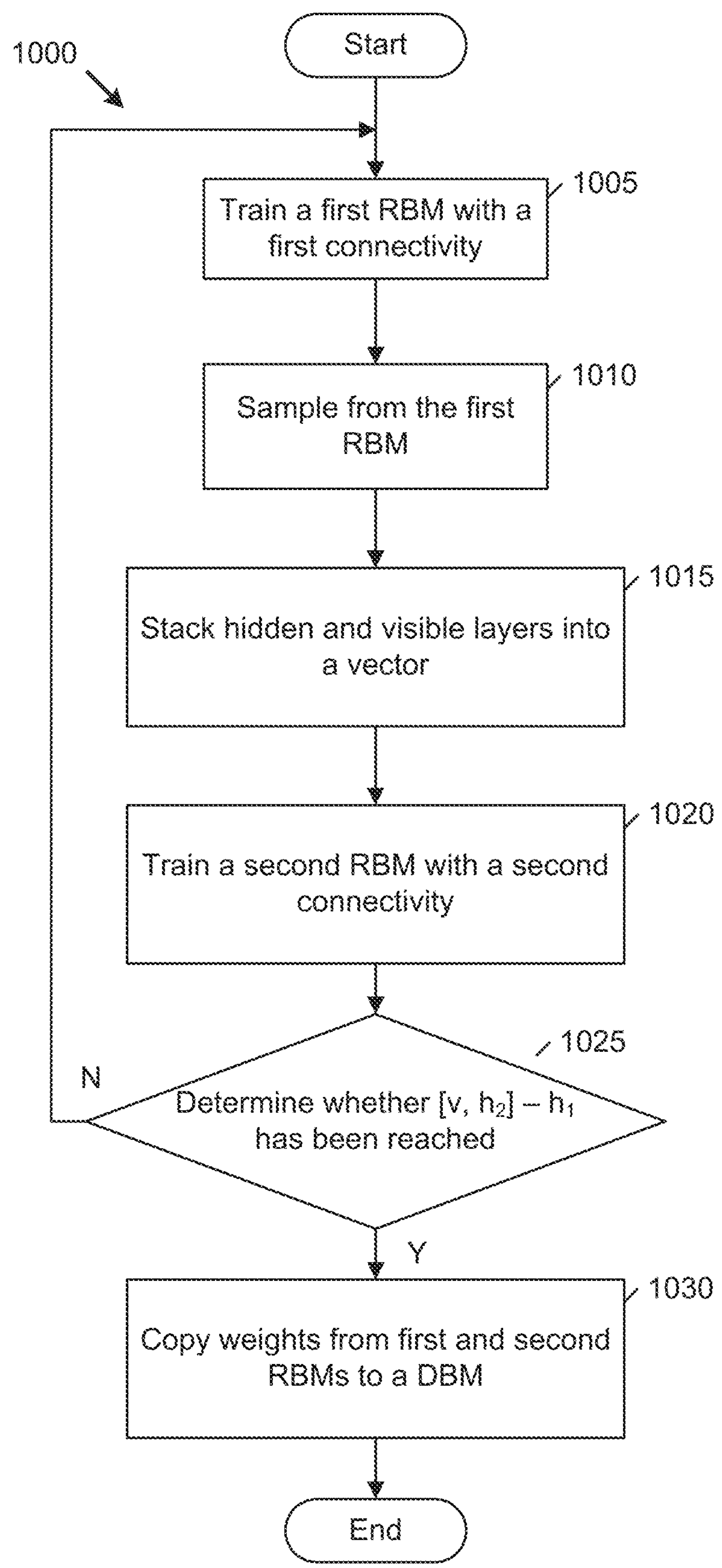
FIG. 10 conceptually illustrates a process for reverse layerwise training in accordance with an embodiment of the invention.

A process for reverse layerwise training in accordance with an embodiment of the invention is conceptually illustrated in FIG. 10. Process 1000 trains (1005) a first RBM with connectivity v-$h_L$. Process 1000 samples (1010) $h_L$~p($h_L$|v) from the trained RBM. The process then stacks (1015) v and $h_L$ into a vector [v, $h_L$] and trains (1020) a second RBM with connectivity [v, $h_L$]-$h_{L-1}$. Process 1000 then determines (1025) whether [v, $h_2$]-$h_1$ has been reached. When it has not been reached, process 1000 returns to step 1005. When process 1100 determines that [v, $h_2$]-$h_1$ has been reached, the process copies (1030) the weights from each of these intermediate RBMs into their respective positions in the DBM. In some embodiments. DBMs can then be fine-tuned by regular end-to-end training.

Boltzmann Machines for Time Series

Many problems (e.g., modeling patient trajectories) require the ability to generate time series. That is, to generate a sequence of states $\{v(t)\}_{t=0}^{\tau}$. Two approaches in accordance with numerous embodiments of the invention are described below.

Figure 11:
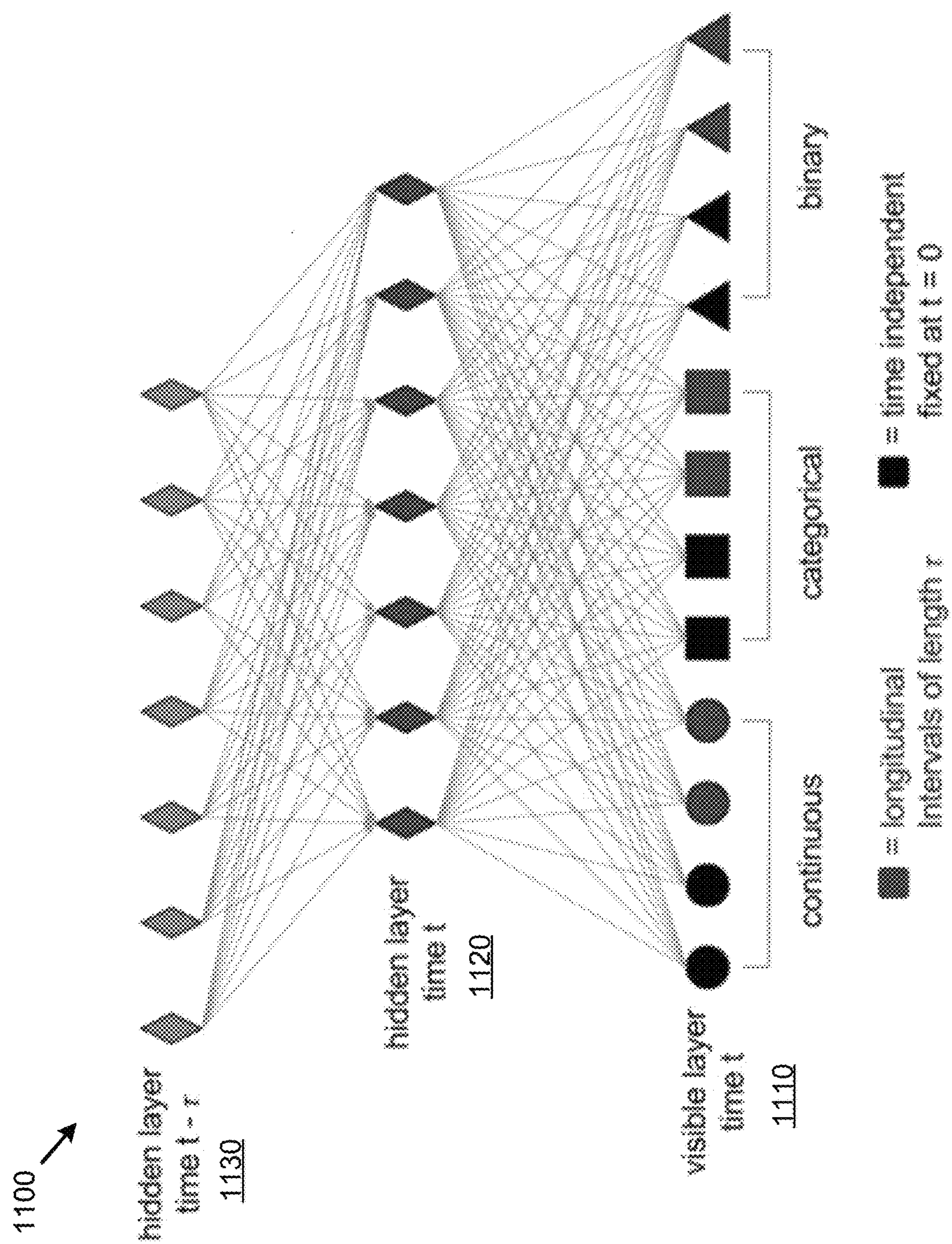
FIG. 11 illustrates an architecture for a generalized Deep Temporal Boltzmann Machine in accordance with many embodiments of the invention.

An Autoregressive Boltzmann Machine (ADBM) is a DBM where the hidden layers have undirected edges connecting neighboring time points. As a result, an ADBM relates nodes to their previous timepoints. A generalized ADBM in accordance with some embodiments of the invention is illustrated in FIG. 11. The generalized ADBM 1100 shows a visible layer 1110 at time t connected to a hidden layer 1120, also at time t. Hidden layer 1120 is further connected to another hidden layer 1130 that incorporates data that is offset from time t by τ.

As a result, an ADBM is a model for entire sequences that describes the joint probability distribution p(v(0), . . . , v(τ)). Specifically, let x(t)=[v(t),$h_1$(t), . . . , $h_L$(t)] denote the state of all of the layers at time t. Moreover, let $E_{DBM}$(x(t)) be the energy of a DBM given by $$E(v, h_1, \dots, h_L) = -a(v) - \sum_{l=1}^{l=L} b_l(h_l) - v^T \frac{W}{(\sigma\varepsilon_1^T)^2} h_1 - \sum_{l=1}^{l=L-1} h_l^T \frac{W_l}{(\varepsilon_l \varepsilon_{l+1}^T)^2} h_{l+1} \tag{11}$$

The energy function of the ADBM is:

$$E(\{x(t)\}_{t=0}^{\tau}) = \sum_{t=0}^{\tau} E_{DBM}(x(t)) - \sum_{t=1}^{\tau} h_L^T(t) \frac{\Omega}{(\varepsilon_L \varepsilon_L^T)^2} h_L(t-1) \tag{12}$$

For simplicity, this has been illustrated with a single autoregressive connection connecting the last hidden layer with its previous value. However, one skilled in the art will recognize that this model can be extended to include multiple time delays or inter-temporal connections between layers.

ADBMs, as described in the previous section, are able to capture correlations through time, but they are often unable to represent non-stationary distributions or distributions with drift. For example, most patients with a degenerative disease will tend to worsen over time—an effect that the ADBM cannot capture. To capture this effect, many embodiments of the invention implement a Generalized Conditional Boltzmann Machine (GCBM). Consider a time series of visible units $\{v(t)\}_{t=0}^{\tau}$. The joint probability distribution can be factorized into a product $p(v(t), \ldots, v(t))=p_0(v(t))=\Pi_{t=1}^{\tau}p(v(t)|v(t-1))$. In several embodiments, this model can be constructed from two DBMs. First, a non-time dependent DBM, $p_0$, can be trained on all of the data. Next, a time dependent DBM can be trained on a Composite Layer created by joining all of the neighboring time points [v(t), v(t−1)]. In this example, the second DBM describes the joint distribution p(v(t),v(t−1)), which makes it possible to compute both p(v(t)|v(t−1)) and p(v(t−1)|v(t)) allowing for both forward and backwards prediction.

Although this example is described using a single time lag, one skilled in the art will recognize that processes in accordance with many embodiments of the invention can be adjusted to consider longer and/or multiple time lags. For example, the second DBM can be trained on a Composite Layer that can be readily extended to include multiple time lags. e.g., [v(t),v(t−1), . . . , v(t−n)].

Training RBMs

There are multiple pathways for improving the performance of RBMs. These include new approaches to regularization, novel optimization algorithms, alternative objective functions, and improved gradient estimators. Systems and methods in accordance with several embodiments of the invention implement alternative objective functions and improved gradient estimators.

Adversarial Objectives for RBMs

A machine learning model is generative if it learns to draw new samples from an unknown probability distribution. Generative models can be used to learn useful representations of data and/or to enable simulations of systems with unknown, or very complicated, mechanistic laws. A generative model defined by some model parameters θ describes the probability of observing some variable v. Therefore, training a generative model involves minimizing a distance between the distribution of the data, $p_d(v)$, and the distribution defined by the model, $p_\theta(v)$. The traditional method for training a Boltzmann machine maximizes the log-likelihood, which is equivalent to minimizing the forward Kullback-Liebler (KL) divergence:

$$D_{KL}(p_d\|p_\theta) = \int dv p_d(v) \log\left(\frac{p_d(v)}{p_\theta(v)}\right). \tag{13}$$

The forward KL divergence, $D_{KL}(p_d\|p_\theta)$, accumulates differences between the data and model distributions weighted by the probability under the data distribution. The reverse KL divergence, $D_{KL}(p_{74}\|p_d)$, accumulates differences between the data and model distributions weighted by the probability under the model distribution. As a result, the forward KL divergence strongly punishes models that underestimate the probability of the data, whereas the reverse KL divergence strongly punishes models that overestimate the probability of the data.

There are a variety of sources of stochasticity that enter into the training of an RBM. The stochasticity implies that different models may become statistically indistinguishable if the differences in their log-likelihoods are smaller than the errors in estimating them. This creates an entropic force because there will be many more models with a small $D_{KL}(p_d\|p_\theta)$ than there are models with both a small $D_{KL}(p_d\|p_\theta)$ and $D_{KL}(p_\theta\|p_d)$. As a result, training an RBM using a standard approach with PCD decreases $D_{KL}(p_d\|p_\theta)$ (as it should) but tends to increase $D_{KL}(p_\theta\|p_d)$. This leads to distributions with spurious modes and/or to distributions that are over-smoothed.

One can imagine overcoming the limitations of maximum likelihood training of RBMs by minimizing a combination of the forward and reverse KL divergences. Unfortunately, computing the reverse KL divergence requires knowledge of $p_d$, which is unknown. In many embodiments, rather than the reverse KL divergence, RBMs can be trained using a novel type of f-divergence as a discriminator divergence:

$$D_D(p_d\|p_\theta) := -\int dv p_\theta(v) \log\left(\frac{2p_d(v)}{p_d(v)+p_\theta(v)}\right), \tag{14}$$

Notice that the optimal discriminator between $p_d$ and $p_\theta$ will assign a posterior probability $$p(\text{data} \mid v) = \frac{p_d(v)}{p_d(v)+p_\theta(v)} \tag{15}$$

that the sample v was drawn from the data distribution. Therefore, the discriminator divergence can be written as $$D_D(p_d\|p_\theta) = -\log 2 - \int dv p_\theta(v) \log(p(\text{data}|v)) \tag{16}$$

to show that it measures the probability that the optimal discriminator will incorrectly classify a sample drawn from the model distribution as coming from the data distribution.

The discriminator divergence belongs to the class of f-divergences defined as $D_f(p\|q) := \int dx q(x) f(p(x)/q(x))$. The function that defines the discriminator divergence is $$f(t) = \log\left(\frac{t+1}{2t}\right) \tag{17}$$

which is convex with f(1)=0, as required. It can be shown that the discriminator divergence upper bounds the reverse KL divergence:

$$\log 2 + D_D(p_d\|p_\theta) = \int dv p_\theta(v) \log\left(1 + \frac{p_\theta(v)}{p_d(v)}\right) \geq D_{KL}(p_\theta\|p_d).$$

It is often difficult to access $p_d(v)$ directly or to compute the reverse KL divergence. However, methods in accordance with numerous embodiments of the invention can train a discriminator to approximate Equation 15 and, therefore, can approximate the discriminator divergence.

A generator that is able to trick the discriminator so that $p(\text{data}|v) \approx 1$ for all samples drawn from $p_\theta$ will have a low discriminator divergence. The discriminator divergence closely mirrors the reverse KL divergence and strongly punishes models that overestimate the probability of the data.

Methods in accordance with numerous embodiments of the invention implement a Boltzmann Encoded Adversarial Machine (BEAM) for training an RBM against an adversary. A BEAM in accordance with a number of embodiments of the invention minimizes a loss function that is a combination of the negative log-likelihood and an adversarial loss. The adversarial component ensures that BEAM training performs a simultaneous minimization of both the forward and reverse KL divergences, which prevents the oversmoothing problem observed with regular RBMs.

A method for training a BEAM in accordance with many embodiments of the invention is described below:

```
Input:
n = number of epochs;
m = number of fantasy particles;
k = number of Gibbs sampling steps;
α = weight of the likelihood and adversarial gradients
Initialize:
sample F ~ pθ(v) using k-steps of Gibbs sampling;
for epoch = 1,...,n do
  | while True do
  |   | V ← minibatch;
  |   | if len(V) == 0 then
  |   |    | break;
  |   | end
  |   | sample F ~ pθ(v) using k-steps of Gibbs sampling;
  |   | compute the log-likelihood gradient g_£(V,F,θ);
  |   | encode Ṽ = {E_pθ(h|v)[h]}_v∈V and F̃ = {E_pθ(h|v)[h]}_v∈F;
  |   | train discriminator on Ṽ and F̃;
  |   | compute the adversarial gradient g_V(F̃,θ);
  |   | compute the full gradient g = αg_£ + (1 − α)g_V;
  |   | update the model parameters using the gradient;
  | end
end
```

Figure 12:
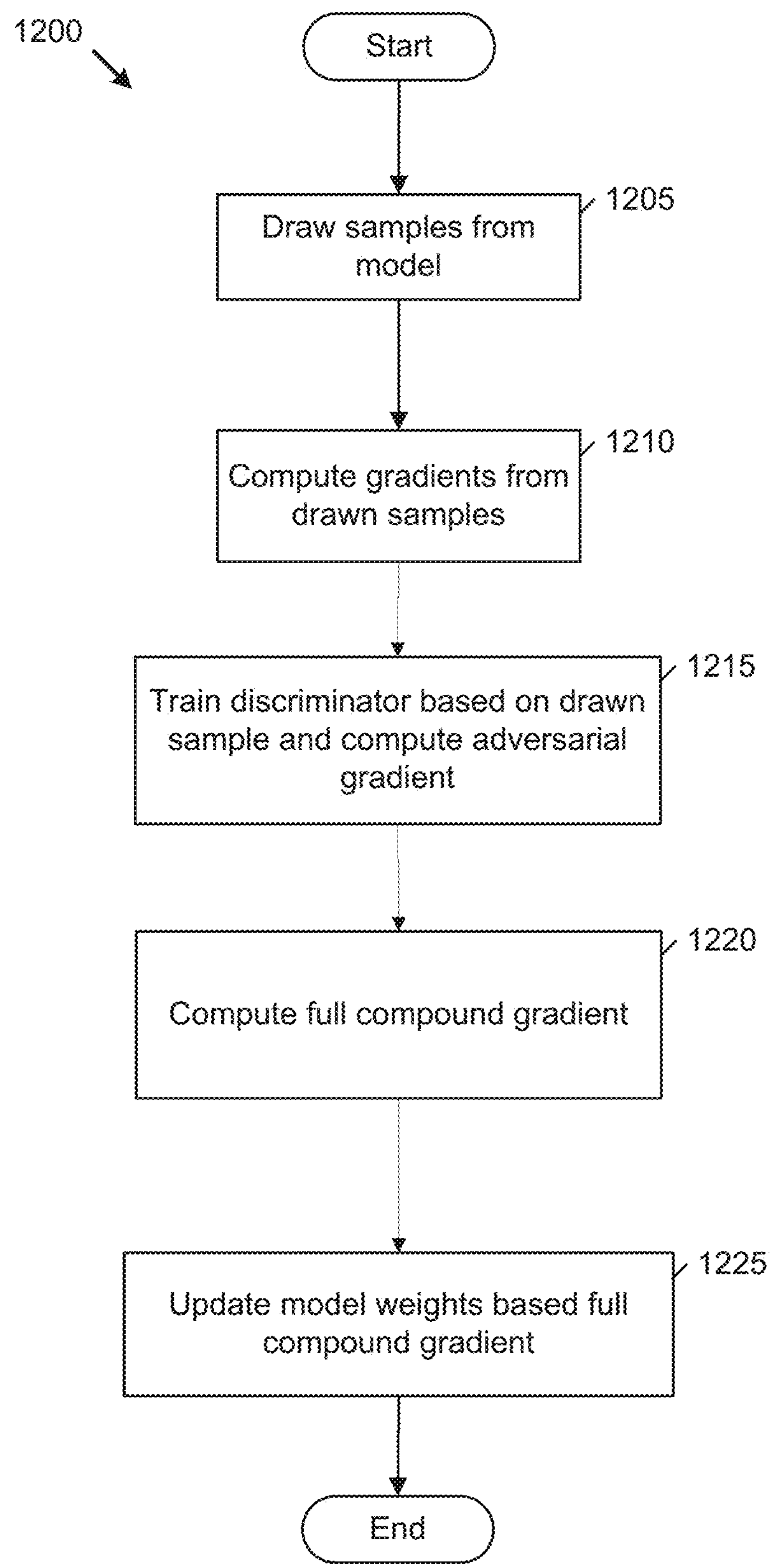
FIG. 12 conceptually illustrates a process for training a Boltzmann Encoded Adversarial Machine in accordance with some embodiments of the invention.

A process for training an adversarial model in accordance with some embodiments of the invention is conceptually illustrated in FIG. 12. The process 1200 draws (1205) samples from a model, such as (but not limited to) Boltzmann machines such as those described above. Samples can be drawn from a model according to a variety of methods, including (but not limited to) k-steps Gibbs sampling and TDS. The process 1200 then computes (1210) gradients based on the drawn samples. Process 1200 trains (1215) a discriminator based on the drawn samples and computes an adversarial gradient based on the classification of the samples, as either drawn from the model or drawn from the data. In many embodiments, the process 1200 then computes (1220) a full compound gradient and updates (1225) the model parameters using the full gradient.

Figure 13:
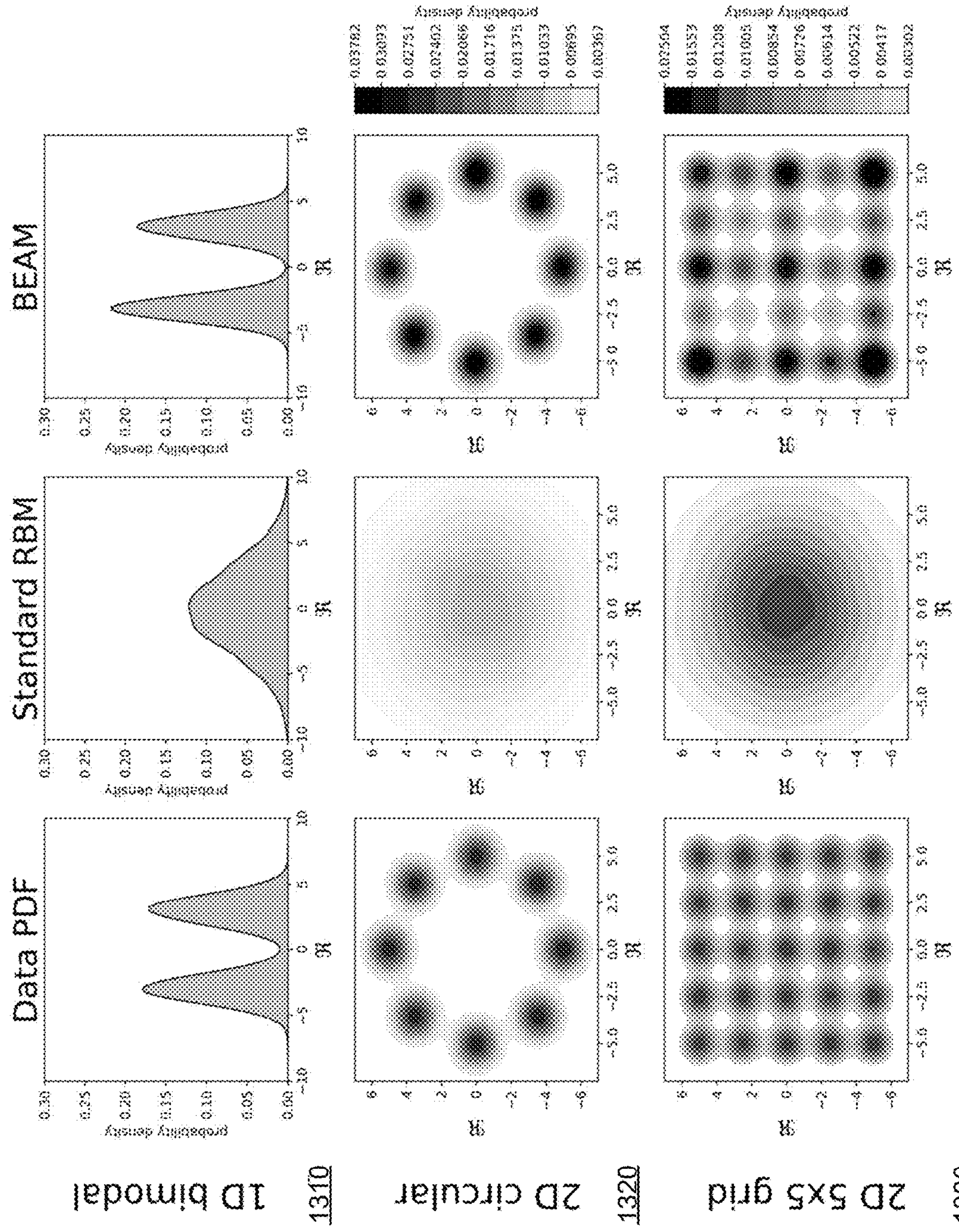
FIG. 13 illustrates resulting samples drawn from RBMs trained to maximize log likelihood and from RBMs trained as BEAMs.

FIG. 13 presents some comparisons between Boltzmann machines trained to maximize log likelihood and those trained as BEAMs. The examples of this figure illustrate three multimodal data distributions: a bimodal mixture of Gaussians in 1-dimension (1310), a mixture of 8 Gaussians arranged in a circle in 2-dimensions (1320), and a mixture of 25. Gaussians arranged in a grid in 2-dimensions (1330). Problems similar to the 2-dimensional mixture of Gaussians examples are commonly used for testing GANs. In each case, the regular Boltzmann machine learns a model with a pretty good likelihood by spreading the probability over the support of the data distribution. In contrast, the Boltzmann machines trained using as BEAMs learn to reproduce the data distributions very accurately.

Figure 14:
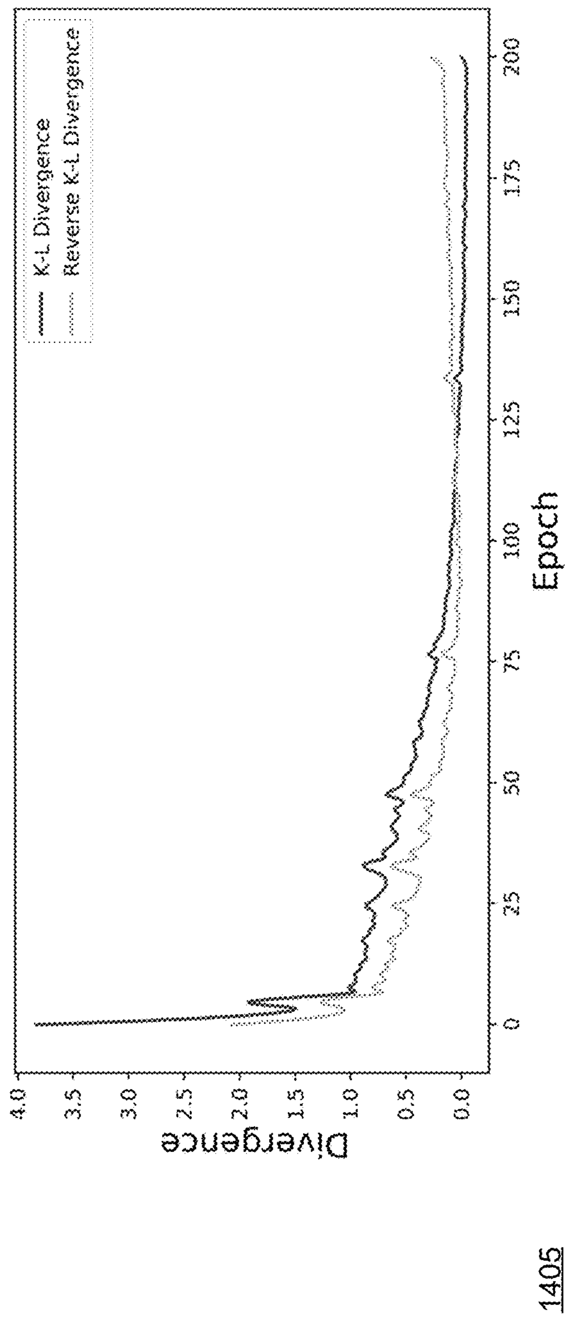
FIG. 14 illustrates results of training a BEAM on a 2D mixture of Gaussians in accordance with a number of embodiments of the invention.
Figure 14:
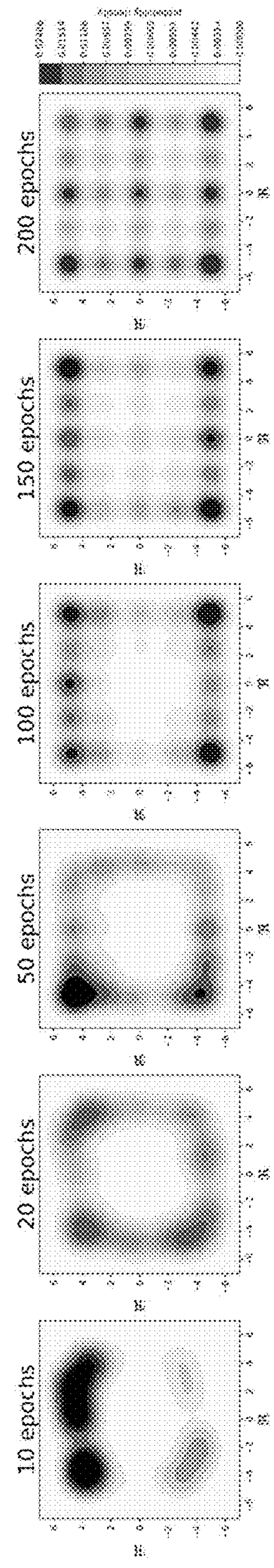

An example of results of training a BEAM on a 2D mixture of Gaussians is illustrated in FIG. 14. The first panel 1405 illustrates estimates of the forward KL divergence, $D_{KL}(p_d \| p_\theta)$, and the reverse KL divergence, $D_{KL}(p_\theta \| p_d)$, per training epoch. The first panel 1405 illustrates that training an RBM as a BEAM decreases both the forward and reverse KL divergences. The second panel 1410 illustrates distributions of fantasy particles at various epochs during training. In the early stages of training, the BEAM fantasy particles are spread out across the support of the data distribution capturing the modes near the edge of the grid. These early epochs resemble the distributions obtained with GANs, which also concentrate density in the modes near the edge of the grid. As training progresses, the BEAM progressively learns to capture the modes near the center of the grid.

Figure 15:
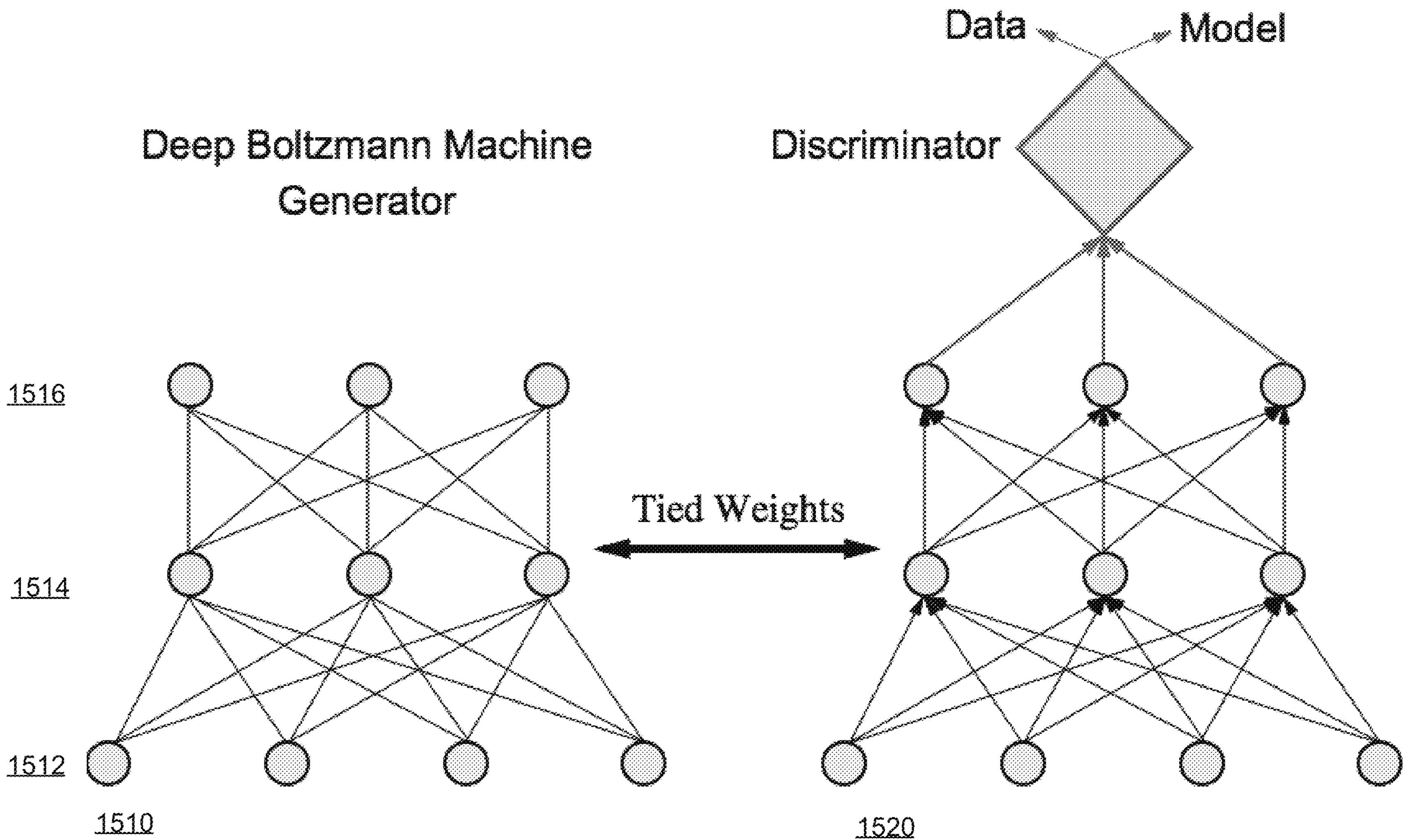
FIG. 15 illustrates an architecture for implementing a Boltzmann Encoded Adversarial Machine in accordance with a number of embodiments of the invention.

An architecture of a Boltzmann Encoded Adversarial Machine (BEAM) in accordance with some embodiments of the invention is illustrated in FIG. 15. The illustrated example shows two steps of the BEAM architecture. In the first stage 1510, a generator (e.g., an RBM) with a visible layer 1512 and hidden layers 1514 and 1516. Generators in accordance with a number of embodiments of the invention are trained to encode input data by passing the input data through the visible layer to be encoded in a set of nodes of a hidden layer. Generators in accordance with several embodiments of the invention are trained with an objective to generate realistic samples from a complex distribution. In many embodiments, objective functions for training generators can include a contribution from an adversarial loss generated by a critic (or discriminator).

In the second stage 1520, a hidden layer of the generator feeds into a classifier of a discriminator (or critic) that evaluates the hidden layers to distinguish samples drawn from the data from samples drawn from the model using tied weights learned by the generator. Therefore, the discriminator (or adversary) is constructed by encoding the visible units using a single forward pass through the layers of the generator and then applying a classifier (e.g., logistic regression, nearest neighbor classifiers, and random forest) trained to discriminate between samples from the data and samples from the model. By refining the discriminator, processes in accordance with many embodiments of the invention allow for an improved model of complex probability distributions. Although shown in separate stages, the BEAM in accordance with many embodiments of the invention is trained with a compound objective that trains both the critic and the generator simultaneously. In certain embodiments, the discriminator includes a simple classifier that requires very little training.

The objective function in accordance with a number of embodiments of the invention is $$\mathfrak{C} = -\gamma \mathcal{L} - (1-\gamma)\mathcal{A}, \quad (18)$$

which includes a contribution from adversarial term. $\mathcal{A}$, from a critic. Adversarial terms in accordance with a number of embodiments of the invention can be defined as $$\mathcal{A} := \int dv\,dh\,p_\theta(v,h)T(v,h). \quad (19)$$

where T(v,h) is a critic function. In some embodiments, the adversary uses the same architecture and weights as the RBM, and encodes visible units into hidden unit activations. These hidden unit activations, computed for both the data and fantasy particles sampled from the RBM, are used by a critic to estimate the distance between the data and model distributions.

To compute the derivatives for training the generator, methods in accordance with some embodiments of the invention use the stochastic derivative trick:

$$\begin{aligned}\partial_\theta \mathcal{A} &= \frac{\partial}{\partial\theta}\int dvdh\,p(v,h)T(v,h) \\ &= \int dvdh\,T(v,h)\frac{\partial}{\partial\theta}p(v,h) \\ &= \int dvdh\,T(v,h)\frac{p(v,h)}{p(v,h)}\frac{\partial}{\partial\theta}p(v,h) \\ &= \int dvdh\,T(v,h)p(v,h)\partial_\theta \log p(v,h) \\ &= \langle T(v,h)\partial_\theta \log p(v,h)\rangle_{p(v,h)} \\ &= -\langle T(v,h)\rangle_{p_\theta(v,h)}\langle -\partial_\theta E_\theta(v,h)\rangle_{p_\theta(v,h)} + \\ &\quad \langle T(v,h)(-\partial_\theta E_\theta(v,h))\rangle_{p_\theta(v,h)} \\ &= Cov_{p_\theta(v,h)}[T(v,h), -\partial_\theta E_\theta(v,h)].\end{aligned} \tag{20}$$

where $\partial_\theta \log p_\theta(v,h) = -\langle -\partial_\theta E_\theta(v,h)\rangle p_\theta(v,h) - \partial_\theta E_\theta(v,h)$ is used for an RBM.

In principle, the critic can be any function of the visible and hidden units. However, based on the discriminator divergence, methods in accordance with several embodiments of the invention use a critic that is monotonically related to p(data|v). Although the discriminator divergence suggests that one could use log p(data|v), methods in accordance with certain embodiments of the invention use a linear function T(v)=2*p(data|v)−1. Typically, the optimal discriminator can be approximated as a function of the hidden units activations $p(\text{data}|v) \approx g(\langle h\rangle_{p\theta(h|v)})$. The function g(•) could be implemented by a neural network, as in most GANs, or using a simpler algorithm such as a random forest or nearest neighbor classifier. In a number of embodiments, a simple approximation to the optimal discriminator can be sufficient because the classifier can operate on the hidden unit activities of the RBM generator rather than the visible units. Therefore, the optimal critic can be approximated using nearest neighbor methods.

Suppose $X=\{x_1, \ldots, x_N\}$ are identically and independently distributed samples from an unknown probability distribution with pdf p(x) in $\mathbb{R}^n$. In a variety of embodiments, p(x) is estimated at an arbitrary point x based on a k-nearest-neighbor estimate. Specifically, methods in accordance with some embodiments of the invention fix some positive integer k and compute the k nearest neighbors to x in X. Then, $d_k$ is defined to be the distance between x and the furthest of the nearest-neighbors and the density p(x) is estimated to be the density of the uniform distribution on a ball of radius $d_k$. That is, $$p(x) \approx k\left(\frac{\pi^{\frac{n}{2}}}{\Gamma\left(\frac{n}{2}+1\right)}d_k^n\right)^{-1}. \tag{21}$$

Now denote by $p_\theta(v)$ and $p_d(v)$ the unknown pdfs of the model and data distributions, respectively, and define the distance between two vectors v and v' as the Euclidean distance between their hidden unit activations, $d(v,v') = \|\langle h\rangle_{p\theta(h|v)} - \langle h\rangle_{p\theta(h|v')}\|$. This distance may no longer satisfy all of the properties of a proper metric. Let $X=\{v_1, \ldots, v_{2N}\}$ be a collection of samples where exactly half are drawn from $p_\theta$ and half from $p_d$. Fix some k and compute the k nearest neighbors in X, denoting by $d_k$ the distance to the furthest. Then the denominator is estimated as described above. Let j be the number of nearest neighbors which come from $p_d$ as opposed to $p_\theta$. The numerator then can be estimated as uniform on the same size ball with only j/k of the density of the denominator, allowing the nearest-neighbor critic to be defined $T_{NN}(v) := j/k$. In many embodiments, the nearest neighbors can be computed from a cached minibatch of samples from the model combined with a minibatch of samples from the training dataset.

The distance-weighted nearest-neighbor critic is a generalization which adds some continuity to the nearest-neighbor critic by applying an inverse distance weighting to the ratio count. Specifically, let $\{d_0, \ldots, d_k\}$ be the distances of the k-nearest neighbors, with $\{d_0, \ldots, d_j\}$ the distances for the neighbors originating from the data samples and $\{d_{j+1}, \ldots, d_k\}$ the distances for the neighbors originating from the model samples. In many embodiments, the distance-weighted nearest-neighbor critic can be defined as:

$$T_{DNN}(v) := \frac{\sum_{i=1}^{j}\frac{1}{d_i+\varepsilon}}{\sum_{i=1}^{k}\frac{1}{d_i+\varepsilon}}, \tag{22}$$

where ε is a small parameter that regularizes the inverse distance.

In the context of most formulations of GANs, which use feed-forward neural networks for both the generator and the discriminator, one could say that BEAMs use the RBM as both the generator and as a feature extractor for the adversary. In various embodiments, this double-usage allows the reuse of a single set of fantasy particles for multiple steps of the training algorithm. Specifically, a single set of M persistent fantasy particles are updated k times per gradient evaluation. In many embodiments, the same set of fantasy particles are used to compute the log-likelihood derivative and the adversarial derivative. Then, these fantasy particles can replace the fantasy particles from the previous gradient evaluation in the nearest neighbor estimates of the critic value. Reusing the fantasy particles for each step means that BEAM training has roughly the same computational cost as training an RBM with PCD.

Improved Gradient Estimates

The gradients of the log-likelihood and the adversarial term both involve expectation values with respect to the model distribution. Unfortunately, these expectation values cannot be computed exactly. As a result, the expectation values can be approximated using Monte Carlo methods or other approximations. The accuracy of these approximate gradients can have a significant effect on the utility of the resulting model. Different approaches to improving the accuracy of the approximate gradients in accordance with certain embodiments of the invention are described below.

Mean-Field Approximations and Shrinkage Estimates

Monte Carlo estimates of the gradients have the advantage of being unbiased. That is, $$\frac{1}{N}\sum_k f(v_k, h_k) \to \langle f(v,h)\rangle_{p_\theta(v,h)} \text{ as } N \to \infty.$$

However, the estimates may have a high variance when N is small. On the other hand, mean field estimates such as those derived from the Thouless-Andersen-Palmer (TAP) expansion are analytic and have zero variance, but have a bias that can be difficult to control. Let $f(\omega)=\omega f_{MC}+(1-\omega)f_{MF}$ be an estimate created from a convex combination of a Monte Carlo estimate $f_{MC}$ and a mean field estimate $f_{MF}$. It is easy to show that $\text{Bias}^2[f]=(1-\omega)^2\text{Bias}^2[f_{MF}]$ and $\text{Var}[f]=\omega^2\text{Var}[f_{MC}]$ so that the mean squared error of f is $\text{MSE}[f]=\text{Bias}^2[f]+\text{Var}[f]=(1-\omega)^2\text{Bias}^2[f_{MF}]+\omega^2\text{Var}[f_{MC}]$. Therefore, one can generally choose a value of w to minimize the mean squared error of the combined estimator.

Tempered Sampling

Drawing samples from a probability distribution is an important component of many processes for training models in accordance with many embodiments of the invention. This can often be done with a simple function call for many 1-dimensional distributions. However, random sampling from Boltzmann machines is much more complicated.

Sampling from a Boltzmann machine is usually performed using Gibbs sampling. Gibbs sampling is a local sampling process, which means that successive samples are correlated. Drawing uncorrelated samples requires one to make many Gibbs sampling steps for each successive sample. As a result, drawing a batch of uncorrelated random samples from a Boltzmann machine can take a long time. A batch of random samples is required for each gradient update—if it takes a long time to generate each batch, it can make training a Boltzmann machine take such a long time that it becomes impractical. Therefore, methods that decrease the correlation between successive samples from a Boltzmann machine can greatly accelerate the learning process.

Many methods for accelerated sampling from Boltzmann machines rely on an analogy with temperature from statistical physics. To do this, methods in accordance with a number of embodiments of the invention introduce a fictional inverse temperature J into a Boltzmann machine by defining the probability distribution as:

$$p_\beta(v,h)=Z_\beta^{-1}e^{-\beta E(v,h)} \tag{23}$$

The original distribution of the Boltzmann machine is recovered by setting $\beta=1$.

The fictional temperature is useful because raising the temperature (i.e., decreasing $\beta$) decreases the autocorrelation between samples. Consider a situation with starting configuration (v,h) and ending at configuration (v',h'). The initial energy is E(v,h). As one moves from the initial to the final configuration, the intermediate configurations will have varying energies. If the maximal energy from these intermediate configurations is $E_{max}$ then the time to travel from (v,h) to (v', h') roughly scales as:

$$\tau\sim e^{\beta(E_{max}-E(v,h))} \tag{24}$$

Therefore, decreasing $\beta$ will decrease the number of Gibbs sampling steps required to move between distant configurations.

Although raising the temperature will decrease the mixing time, it also changes the resulting probability distribution. Therefore, simply sampling from a model with a $\beta<<1$ during training will not allow a model to learn correctly. Processes in accordance with certain embodiments of the invention use a process called parallel tempering (in the machine learning and statistics literature) or replica exchange (in the physics community). In parallel tempering in accordance with a variety of embodiments of the invention, multiple Gibbs sampling chains are run in parallel, each at a different temperature. Periodically, one attempts to swap the configurations of two chains. In several embodiments, the swap can be accepted or rejected based on a criterion (e.g., the Metropolis criterion) to ensure that entire system stays at equilibrium. After a long time, a configuration that started out at $\beta=1$ will travel to a chain with a lower temperature (where it can cross energy barriers more easily) and back to the chain running at $\beta=1$. This ensures that the chain running at $\beta=1$ has a faster mixing time while still sampling from the correct probability distribution. There is a computational cost, however, because many Gibbs sampling chains have to be run in parallel.

In some embodiments of the invention, the process uses Temperature Driven Sampling (TDS), which greatly improves the ability to train Boltzmann machines without incurring significant additional computational cost. TDS is a variant of a sequential Monte Carlo sampler. A collection of m samples are evolved independently using Gibbs sampling updates from the model. Note that this is not the same as running multiple chains for a parallel tempering process because each of the m samples in the sequential Monte Carlo sampler will be used compute statistics, as opposed to just the samples from the $\beta=1$ chain during parallel tempering. Each of these samples has an inverse temperature that is drawn from a distribution with mean $\langle\beta\rangle=1$ and a variance $\text{Var}[\beta]<1$. In several embodiments, the inverse temperatures of each sample can be independently updated once for every Gibbs sampling iteration of the model. In a variety of embodiments, the updates are autocorrelated across time so that the inverse temperatures are slowly varying. As a result, the collection of samples are drawn from a distribution that is close to the model distribution, but with fatter tails. This allows for much faster mixing, while ensuring that the model averages (computed over the collection of m samples) remain close approximations to averages computed from the model with $\beta=1$. An example of sampling from an autocorrelated Gamma distribution is described below.

```
Input:
Autocorrelation coefficient 0 ≤ φ < 1.
Variance of the distribution Var[β] < 1.
Current value of β.
Set: v = 1/Var[β] and c = (1 − φ)Var[β].
Draw z ~ Poisson(β*φ/c).
Draw β' ~ Gamma(v+z,c).
return β'
```

TDS includes a standard Gibbs sampling based sequential Monte Carlo sampler in the limit that $\text{Var}[\beta]\rightarrow 0$. The samples drawn with TDS are not samples from the equilibrium distribution of the Boltzmann machine. In certain embodiments, the drawn samples are re-weighted to correct for the bias due to the varying temperature.

```
Input:
Number of samples m.
Number of update steps k.
Autocorrelation coefficient for the inverse temperature 0 ≤ φ < 1.
Variance of the inverse temperature Var[β] < 1.
Initialize:
Randomly initialize m samples {(v_i,h_i)}_{i=1}^m.
Randomly initialize m inverse temperatures β_i ~ Gamma(1/Var[β],
Var[β]).
for t = 1,...,k do
  | for i = 1,..., m do
  |   | Update β_i using a driven gamma sampler.
  |   | Update (v_i,h_i) using Gibbs sampling.
  | end
end
```

Figure 16:
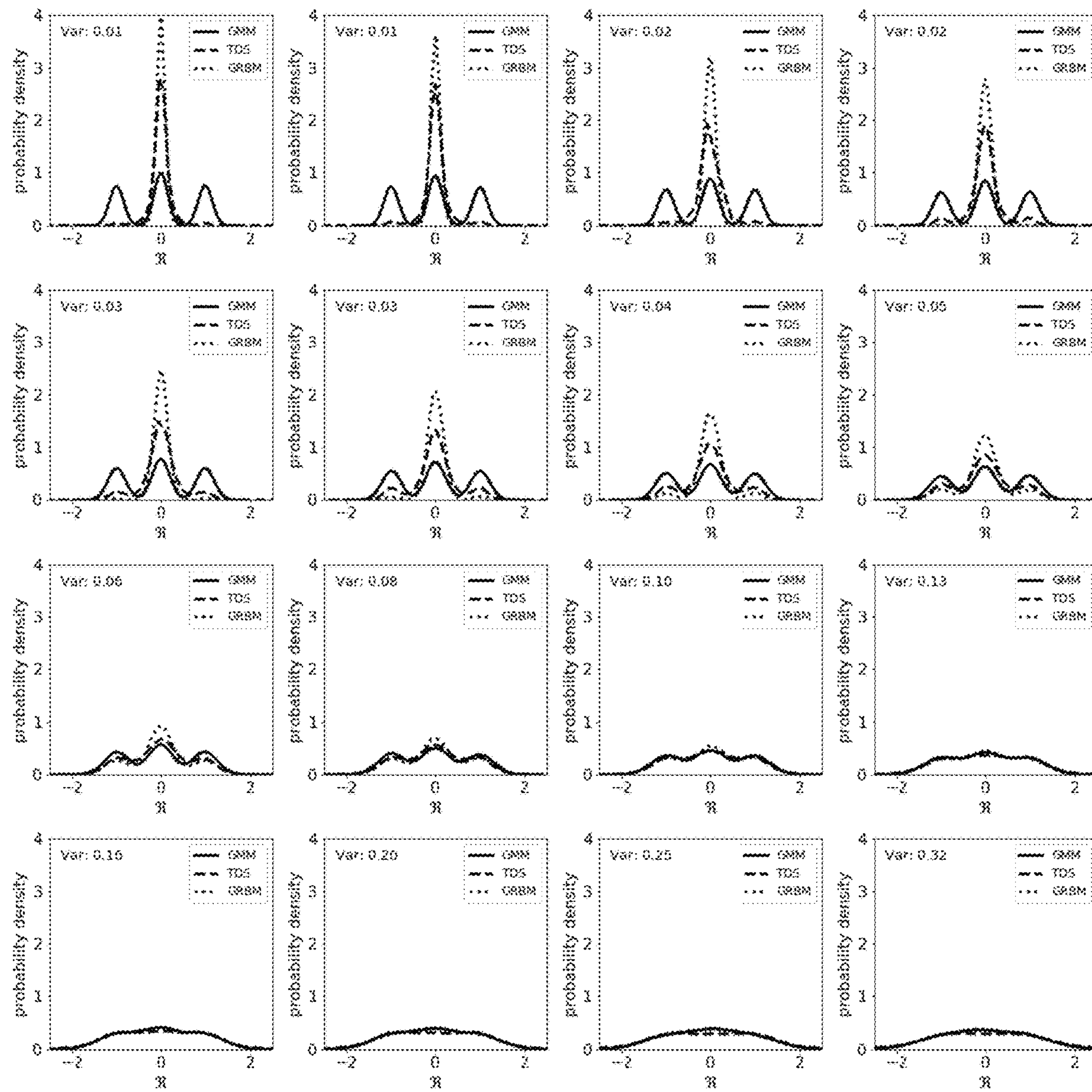
FIG. 16 illustrates a comparison between samples drawn from a Boltzmann machine with regular Gibbs sampling to those drawn using Temperature Driven Sampling.

Temperature Driven Sampling (TDS) improves sampling from a Boltzmann machine. A direct comparison 1600 between samples drawn from a Boltzmann machine with regular Gibbs sampling to those drawn using TDS is illustrated in FIG. 16. GMM refers to samples from a Gaussian mixture model. GRBM refers to samples from the equivalent Boltzmann machine drawn using 10 steps of Gibbs sampling. TDS refers to samples from the equivalent Boltzmann machine drawn using TDS with 10 steps of Gibbs sampling. This example shows a Gaussian mixture model with three modes at (−1, 0, +1) with various standard deviations and using a simple construction to create an equivalent Boltzmann machine with a Gaussian visible layer and a One-hot hidden layer with 3 hidden units. The autocorrelation coefficient and the standard deviation of the inverse temperature were set to 0.9 and 0.95, respectively. All starting samples were initialized from the middle mode. Starting from the middle mode, regular Gibbs sampling is unable to sample from the neighboring modes after 10 steps when the modes are well separated TDS, by contrast, has fatter tails allowing for better sampling of the neighboring modes.

Figure 17:
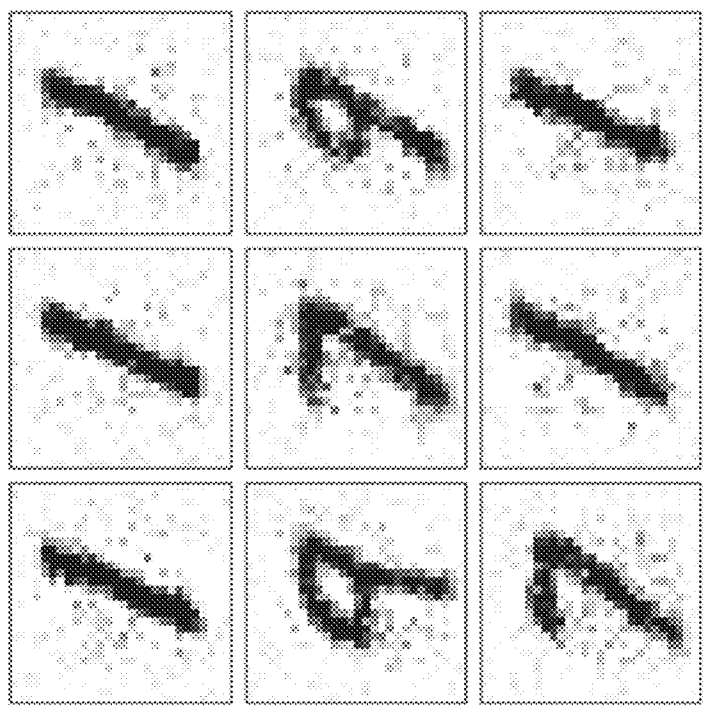
FIG. 17 illustrates a comparison between fantasy particles generated by GRBMs trained on the MNIST dataset using regular Gibbs sampling to those using TDS.
Figure 17:
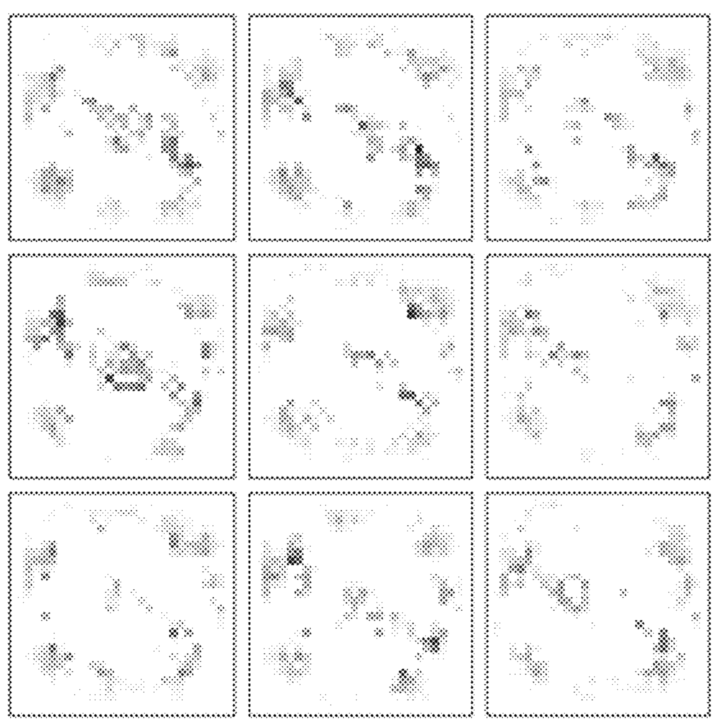

Using TDS at train time can have a pretty dramatic effect on the resulting model. In FIG. 17, two identical Gaussian-Bernoulli RBMs were trained on grayscale images of handwritten digits from the MNIST dataset. Images are from models with identical architectures trained with identical hyperparameters, except that one used regular Gibbs sampling (1710) whereas the other used TDS (1720), or (a) is trained with Var[β]=0 and (b) is trained with Var[β]=0.9. Both models are Gaussian-Bernoulli RBMs with 256 hidden units, trained for 100 epochs of persistent contrastive divergence using the ADAM optimizer with a learning rate of 0.0005 and batch size of 100. Temperature Driven Sampling (TDS) improves learning for a model of the MNIST handwritten digits (grayscale). Both models achieve a low reconstruction error (data not shown), but the GRBM trained with the regular Gibbs sampler fails to generate realistic fantasy particles. The GRBM trained with TDS, by contrast, generates fantasy particles that look like realistic handwritten digits.

Specific processes for drawing samples from a probability distribution in accordance with embodiments of the invention are described above; however, one skilled in the art will recognize that any number of processes can be utilized as appropriate to the requirements of specific applications in accordance with embodiments of the invention.

Applications

That is, even though it may only be possible to predict the probability of a health outcome for an individual patient, this ability makes it possible to precisely predict the number of patients with that health outcome in a large population. For example, predicting health risks makes it possible to accurately estimate the cost of insuring a population. Similarly, predicting the likelihood that a patient will respond to a particular therapeutic makes it possible to estimate the probability of a positive outcome in a clinical trial.

Simulating Patient Trajectories

Developing the ability to accurately predict patients' prognoses is a necessary step towards precision medicine. A patient can be represented as a collection of information that describes their symptoms, their genetic information, results from diagnostic tests, any medical treatments they are receiving, and other information that may be relevant for characterizing their health. A vector containing this information about a patient is sometimes called a phenotype vector. A method for prognostic prediction in accordance with many embodiments of the invention uses past and current health information about a patient to predict a health outcome at a future time.

A patient trajectory refers to a time series that describes a patient's detailed health status (e.g., a patient's phenotype vector) at various points in time. In several embodiments, prognostic prediction takes in a patient's trajectory (i.e., their past and current health information) and makes a prediction about a specific future health outcome (e.g., the likelihood they will have a heart attack within the next 2 years). By contrast, predicting a patient's future trajectory involves predicting all of the information that characterizes the state of their health at all future times.

To frame this mathematically, let v(t) be a phenotype vector containing all of the information characterizing the health of a patient at time t. Therefore, a patient trajectory is a set $\{v(t)\}_{t=0}^{T}$. Many of the examples are described with discrete time steps (e.g., one month), but one skilled in the art will recognize that this is not necessary and that various other time steps can be employed in accordance with various embodiments of the invention. In some embodiments of the invention, models for simulating patient trajectories use discrete time steps (e.g., one month). The length of the time step in accordance with a number of embodiments of the invention will be selected to approximately match the frequency of treatment. A model for patient trajectories in accordance with many embodiments of the invention describes the joint probability distribution of all points along the trajectory, $p(v_0, \ldots, v_T)$. Such a model can be used for prediction by sampling from the conditional probability distribution $p(v_\tau, \ldots, v_T|v_0, \ldots, v_{\tau-1})$. In many embodiments, the model is a Boltzmann machine, as they make it easy to express conditional distributions and can be adapted to heterogeneous datasets, but one skilled in the art will recognize that many of the processes described herein can be applied to other architectures as well.

Clinical Decision Support Systems

Clinical decision support systems provide information to patients, physicians, or other caregivers to help guide choices about patient care. Simulated patient trajectories provide insights into a patient's future health that can inform choices of care. For example, consider a patient with mild cognitive impairment. A physician or caregiver would benefit from knowing the risks that the patient's condition progresses to Alzheimer's disease, or that he or she begins to exhibit other cognitive or psychological systems. In certain embodiments, systems based on simulated patient trajectories can forecast these risks to guide care choices. Aggregating such predictions over a population of patients can also help estimate population level risks, enabling long-term planning by organizations, such as elder care facilities, that act as caregivers to large groups of patients.

In some embodiments, a set of patient trajectories is collected from electronic medical records (also known as real world data), from natural history databases, or clinical trials. The patient trajectories in accordance with many embodiments of the invention can be normalized and used to train a time-dependent Boltzmann machine. To use the model, the medical history for a patient can be input in the form of a trajectory $\{v(t)\}_{t=0}^{t_0}$ where $t_0$ is the current time and use the Boltzmann machine to simulate trajectories from the probability distribution $p(v_{t_0+1}, \ldots, v_T|v_0, \ldots, v_{t_0})$. Then, these simulated trajectories can be analyzed to understand the risks associated with specific outcomes (e.g., Alzheimer's diagnosis) at various future times. In some cases, models that are trained on data with treatment information would contain variables that describe treatment choices. Such a model could be used to assess how different treatment choices would change the patient's future risks by comparing simulated outcome risks conditioned on different treatments. In many embodiments, a caretaker or physician can treat a patient based on the treatment choices and/or the simulated trajectories.

Simulating Control Arms for Clinical Trials

Randomized Clinical Trials (RCTs) are the gold-standard for evidence in assessing therapeutic efficacy. In an RCT, each patient is randomly assigned to one of two study arms: a treatment arm where the patients are treated with an experimental therapy, and a placebo arm where the patients receive a dummy treatment and/or the current standard of care. At the end of the trial, a statistical analysis is performed to determine if patients in the treatment arm were more likely to respond positively to the new therapy than patients in the placebo arm were to respond to the dummy therapy.

In order to have enough statistical power to accurately assess the efficacy of the experimental therapy, RCTs need to include a large number of patients. For example, it is not uncommon for Phase III clinical trials to include thousands of patients. Recruiting the large number of patients necessary to achieve sufficient power is challenging, and many clinical trials never meet their recruitment goals. Although there is, almost by definition, little-to-no data about an experimental therapy there is likely a lot of data about the efficacy of the current standard of care. Therefore, one way to reduce the number of patients needed for clinical trials is to replace the control arm with a synthetic control arm that contains virtual patients simulated from a Boltzmann machine trained to model the current standard of care.

Methods in accordance with several embodiments of the invention use simulations to create a synthetic, or virtual, control arm for a clinical trial by training a Boltzmann machine using data from the control arms of previous clinical trials. In many embodiments, data sets can be constructed by aggregating data from the control arms of multiple clinical trials for a chosen disease. Then, Boltzmann machines can be trained to simulate patients with that disease under the current standard of care. This model can then be used to simulate a population of patients with particular characteristics (e.g., age, ethnicity, medical history) to create a cohort of simulated patients that match the inclusion criteria of new trial. In some embodiments, each patient in the experimental arm can be matched to a simulated patient with the same baseline measurements by simulating from the appropriate conditional distribution of the Boltzmann machine. This can provide a type of counterfactual (i.e., what would have happened to this patient if they had been given a placebo rather than the experimental therapy). In either case, data from simulated patients can be used to supplement, or in place of, data from a concurrent placebo arm using standard statistical methods in accordance with many embodiments of the invention.

Simulating Head-to-Head Clinical Trials

Traditionally, health care in the United States has been provided on a fee-for-service basis. However, there is an ongoing shift towards value based care. In the context of pharmaceuticals, value based care means that the cost of a drug will be based on how effective it is, rather than a simple cost per pill. As a result, governments and other payers need to be able to compare the effectiveness of alternative therapies.

Consider two drugs A and B with the same indication. There are two standard ways to compare the efficacy of A and B. First, one can use electronic health records and insurance claims data to observe how well the drugs are working in the context of real world clinical practice. Alternatively, one can run an RCT to perform a head-to-head comparison of the drugs. Both of these methods take years of additional observation and/or experimentation to arrive at a conclusion about the comparative effectiveness of A and B.

Simulations in accordance with many embodiments of the invention provide an alternative approach for performing head-to-head trials. In some embodiments, detailed individual level data from clinical trials of each drug can be included in the training data for a Boltzmann machine. In some embodiments, samples generated with a Boltzmann machine, such as a BEAM, can be used to simulate a head-to-head clinical trial between A and B. However, individual level data are not usually released for the experimental arms of clinical trials. In the absence of these data, aggregate level data from the experimental arms in accordance with a number of embodiments of the invention can be used to adjust a model that was trained on control arm data.

Learning Unsupervised Genomic Features

The human genome encodes for more than 20 thousands genes that engage in an incredibly complex network of interactions. This network of genetic interactions is so complex that it is intractable to develop a mechanistic model linking genotype to phenotype. Therefore, studies that aim to predict a phenotype from genomic information have to use machine learning methods.

A common goal of a genomic study in the clinical setting is predicting whether or not a patient will respond to a given therapeutic. For example, data describing gene expression (e.g., from messenger RNA sequencing experiments) may be collected at the beginning of a phase-II clinical trial. The response of each patient to the therapeutic is recorded at the end of the trial, and a mathematical model (e.g., linear or logistic regression) is trained to predict the response of each patient from their baseline gene expression data. Successful prediction of patient response would enable the sponsor of the clinical trial to use a genomic test to narrow the study population to a subset of patients where the drug is most likely to be successful. This improves the likelihood of success in a subsequent phase-Ill trial, while also improving patient outcomes through precision medicine.

Unfortunately, phase-II clinical trials tend to be small (200 people). Moreover, sequencing experiments used to measure gene expression are still fairly expensive. As a result, even nonclinical gene expression studies are limited in size. Therefore, the standard task involves training a regression model with up to 20 thousand features (i.e., the expression of the genes) using less than 200 measurements. In general, a linear regression model is underdetermined if the number of features is greater than the number of measurements. Although there are techniques to mitigate this problem, the situation in most 'omics studies is so lopsided that standard approaches fail.

In many embodiments, raw gene expression values are combined into a smaller number of composite features. For example, individual genes interact as parts of biochemical pathways, so one approach is to use known biochemical information to derive scores that describe the activation of pathways. Then, pathway activation scores can be used as features instead of raw expression values. However, due to the complexity of biochemical networks, it can be unclear how to construct pathway activation scores in the first place.

In certain embodiments, Deep Boltzmann Machines (DBMs) are implemented as a tool for unsupervised feature learning that may be useful for 'omics studies. Let v be a vector containing gene expression values determined from an experiment. A DBM describes the distribution of gene expression vectors using a probability distribution $p(v)=\theta dh_1 \ldots dh_L p(v,h_1, \ldots, h_L)$ where the layers of hidden units $h_l$ describe progressive transformations of the gene expression values into higher level features. The model in accordance with many embodiments of the invention can be trained without labels; therefore, in some embodiments, a large data set can be compiled by combining many different studies. In a number of embodiments, the pre-trained DBM can be used to transform a vector of raw gene expression values into a lower dimensional vector of features by computing $\langle h_L \rangle_v = \int dh_1 \ldots dh_L h_L p(h_1, \ldots, h_L|v)$. These lower dimensional features in accordance with certain embodiments of the invention can then be used as input to a simpler supervised learning algorithm to construct a predictor of drug response for a given therapeutic.

Predicting Transcriptomic Responses

Predicting the effect that a change in the activity, or expression, of a gene will have in-human is important for both drug design and drug development. For example, if one could predict the effect that a compound will have in-human then one could perform high-throughput computational screens for drug discovery. Similarly, if one could predict the effect that an investigational drug will have on different types of patients then one could optimize patient selection for phase II clinical trials even though there is no direct data on the action of the drug in-human.

There isn't an obvious way to use supervised learning methods to develop a predictor of transcriptomic response. In many embodiments, transcriptomic responses are predicted using a generative model of gene expression. Let v be a vector of raw gene expression values and let $p_\theta(v)$ be a model of the distribution of gene expression values that is parameterized by $\theta$. Moreover, suppose that the model is parameterized such that $\theta_i$ is related to the mean value of $v_i$, such that increasing (or decreasing) $\theta_i$ leads to an increase (or decrease) in $\langle v_i \rangle$. In many embodiments, the effect of a drug that decreases the activity of gene i is simulated by decreasing $\theta_i$ and computing the change in $|v|$. In a number of embodiments, when the change is small, then this involves computing the derivative $\partial_{\theta_i} \langle v \rangle = \partial_{\theta_i} \partial dvvp_\theta(v)$.

The utility of generative models in accordance with several embodiments of the invention relies on the ability of the model to implicitly learn interactions between gene expression values. That is, the model must know that decreasing the activity of gene i using a therapeutic will—via a complex network of interactions—lead to a decrease in the expression of some other gene j. In numerous embodiments. DBMs as described in previous sections of this application are used as a generative model that implicitly (i.e., without trying to construct a mechanistic understanding of biochemical pathways or other methods of direct gene interaction) learns interaction between genes.

In many embodiments, DBMs trained on gene expression data in a fully unsupervised manner do not have a notion of an individual patient. Instead, the vector of observations v can be broken into two pieces: the vector of gene expression values x and a vector of metadata y. The metadata in accordance with some embodiments of the invention may describe characteristics of the sample such as (but not limited to) which tissue it came from, the health status of the patient, or other information. Then, in a number of embodiments, predictions can be made from the conditional distributions $\partial_{\theta_i} \langle x \rangle_y = \partial_{\theta_i} \partial dxxp_\theta(x|y)$.

Finally, predictions for individual patients in accordance with several embodiments of the invention can use a notion of locality in gene expression space. Let $\mathcal{F}(x|y) := -\log p_\theta(x|y)$ define the energy x given y. In a DBM, this also involves integrating over all the hidden layers. In certain embodiments, local measures of gene interactions can be computed from the derivatives of $\mathcal{F}$ evaluated at x.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A method for generating a Deep Boltzmann Machine (DBM), wherein the method comprises:

generating values from a first restricted Boltzmann machine (RBM) comprising a visible layer and a hidden layer using a Markov chain Monte Carlo (MCMC) method by performing at least one iteration comprising:

generating, from a first set of visible values from the visible layer, a set of hidden values in the hidden layer of the first RBM; and generating a second set of visible values in the visible layer of the first RBM based on the generated set of hidden values;

computing a set of likelihood gradients based on at least one of the first set of visible values and the generated second set of visible values;

computing, based on at least one of the set of hidden values and the second set of visible values, a set of adversarial gradients using an adversarial model, wherein the adversarial model includes an architecture and weights that are the same as that of the first RBM;

computing a set of compound gradients based on the set of likelihood gradients and the set of adversarial gradients;

updating the first RBM based on the set of compound gradients;

sampling the hidden layer from the first RBM;

stacking the visible layer and the hidden layer from the first RBM into a vector;

training a second RBM having a visible layer and a hidden layer, wherein the vector is the visible layer of the second RBM and the hidden layer of the second RBM is equivalent to a layer between the visible layer and the hidden layer of the first RBM; and generating the DBM by copying weights from the first and second RBMs to the DBM, wherein the DBM comprises a visible layer and a plurality of hidden layers.

2. The method of claim 1, wherein the visible layer of the first RBM comprises a composite layer composed of a plurality of sub-layers for different data types.

3. The method of claim 2, wherein the plurality of sub-layers comprises at least one of a Bernoulli layer, an Ising layer, a one-hot layer, a von Mises-Fisher layer, a Gaussian layer, a ReLU layer, a clipped ReLU layer, a student-t layer, an ordinal layer, an exponential layer, and a composite layer.

4. The method of claim 1 further comprising:

receiving a phenotype vector for a patient;

using the first RBM to generate a time progression of a disease; and treating the patient based on the generated time progression.

5. The method of claim 1, wherein the visible layer of the first RBM and the hidden layer of the first RBM are for a first time instance, wherein the hidden layer of the first RBM is further connected to another hidden layer in the DBM that incorporates data from a different second time instance.

6. The method of claim 1, wherein the visible layer of the first RBM is a composite layer comprising data for a plurality of different time instances.

7. The method of claim 1, wherein computing the set of likelihood gradients comprises performing Gibbs sampling.

8. The method of claim 1, wherein the set of compound gradients are weighted averages of the set of likelihood gradients and the set of adversarial gradients.

9. The method of claim 1 further comprising training the adversarial model by:

drawing data samples based on authentic data;

drawing fantasy samples based on values from the first RBM; and training the adversarial model based on the adversarial model's ability to distinguish between the data samples and the fantasy samples.

10. The method of claim 9, wherein training the adversarial model comprises measuring a probability that a particular sample is drawn from either the authentic data or the first RBM.

11. The method of claim 1, wherein the adversarial model is one of a fully-connected classifier, a logistic regression model, a nearest neighbor classifier, and a random forest.

12. The method of claim 1 further comprising using the first RBM to generate a set of samples of a target population.

13. The method of claim 1, wherein computing a set of likelihood gradients comprises computing a convex combination of a Monte Carlo estimate and a mean field estimate.

14. The method of claim 1, wherein computing a set of likelihood gradients comprises:

initializing a plurality of samples;

initializing an inverse temperature for each sample of the plurality of samples; and for each sample of the plurality of samples:

updating the inverse temperature by sampling from an autocorrelated Gamma distribution; and updating the sample using Gibbs sampling.

15. A non-transitory machine readable medium containing processor instructions for generating a Deep Boltzmann Machine (DBM), wherein execution of the instructions by a processor causes the processor to perform a process that comprises:

generating values from a first restricted Boltzmann machine (RBM) comprising a visible layer and a hidden layer using a Markov chain Monte Carlo (MCMC) method by performing at least one iteration comprising:

generating, from a first set of visible values from the visible layer, a set of hidden values in the hidden layer of the first RBM; and generating a second set of visible values in the visible layer of the first RBM based on the generated set of hidden values;

computing a set of likelihood gradients based on at least one of the first set of visible values and the generated second set of visible values;

computing, based on at least one of the set of hidden values and the second set of visible values, a set of adversarial gradients using an adversarial model, wherein the adversarial model includes an architecture and weights that are the same as that of the first RBM;

computing a set of compound gradients based on the set of likelihood gradients and the set of adversarial gradients;

updating the first RBM based on the set of compound gradients;

sampling the hidden layer from the first RBM;

stacking the visible layer and the hidden layer from the first RBM into a vector;

training a second RBM having a visible layer and a hidden layer, wherein the vector is the visible layer of the second RBM and the hidden layer of the second RBM is equivalent to a layer between the visible layer and the hidden layer of the first RBM; and generating the DBM by copying weights from the first and second RBMs to the DBM, wherein the DBM comprises a visible layer and a plurality of hidden layers.

16. The non-transitory machine readable medium of claim 15, wherein the visible layer of the first RBM comprises a composite layer composed of a plurality of sub-layers for different data types.

* * * * *